United States Patent
Maeda et al.

(10) Patent No.: US 7,173,393 B2
(45) Date of Patent: Feb. 6, 2007

(54) PHASE CURRENT DETECTION METHOD, INVERTER CONTROL METHOD, MOTOR CONTROL METHOD, AND APPARATUSES USED IN THESE METHODS

(75) Inventors: Toshiyuki Maeda, Shiga (JP); Tomoisa Taniguchi, Shiga (JP)

(73) Assignee: Daiken Industries, Ltd., Osaka (JP)

( * ) Notice: Subject to any disclaimer, the term of this patent is extended or adjusted under 35 U.S.C. 154(b) by 0 days.

(21) Appl. No.: 10/432,949

(22) PCT Filed: Sep. 27, 2002

(86) PCT No.: PCT/JP02/10132

§ 371 (c)(1),
(2), (4) Date: Jul. 29, 2003

(87) PCT Pub. No.: WO03/030348

PCT Pub. Date: Apr. 10, 2003

(65) Prior Publication Data

US 2004/0169488 A1    Sep. 2, 2004

(30) Foreign Application Priority Data

Sep. 29, 2001  (JP) ............................. 2001-338622
Mar. 25, 2002  (JP) ............................. 2002-084522

(51) Int. Cl.
*H02P 27/04*    (2006.01)

(52) U.S. Cl. ...................... 318/801; 318/254; 318/432; 318/803

(58) Field of Classification Search ................ 318/720, 318/721, 727, 722, 711, 799, 800–809, 701, 318/138, 254, 139, 439, 779, 729, 432, 433; 363/41, 96, 132, 98
See application file for complete search history.

(56) References Cited

U.S. PATENT DOCUMENTS 4,322,671 A  *  3/1982  Kawada et al. ............. 318/798

(Continued)

FOREIGN PATENT DOCUMENTS

JP           04138096 A  *  5/1992

(Continued)

OTHER PUBLICATIONS

Tanizawa, Yoshihiko, et al. The Institute of Electrical Engineers of Japan, Sangyo Denryoku Denki Oyo Kenkyukai Shiryo, Jul. 15, 1994, vol. 1, IEA-94, Nos. 12 to 22, pp. 45-49.

*Primary Examiner*—Paul Ip
(74) *Attorney, Agent, or Firm*—Birch, Stewart Kolasch & Birch, LLP

(57) ABSTRACT

Apparatus and methods for phase current detection used for driving a motor by supplying outputs from a pulse width modulation (PWM) converter to the motor. One method presented provides detecting a DC link current and a vector pattern, determining whether a voltage vector lengths exceeds a predetermined value, and adjusting the voltage vector by adding a positive or reversed voltage based upon the above determination and an integrated error value.

42 Claims, 27 Drawing Sheets

U.S. PATENT DOCUMENTS

| | | | | |
|---|---|---|---|---|
| 4,641,232 A * | 2/1987 | Pitel | ............................ | 363/71 |
| 4,818,927 A * | 4/1989 | Hino et al. | .................. | 318/798 |
| 4,962,976 A * | 10/1990 | Takahashi et al. | ........... | 318/811 |
| 5,329,222 A * | 7/1994 | Gyugyi et al. | ............... | 323/207 |
| 5,436,819 A * | 7/1995 | Mikami et al. | ................ | 363/41 |
| 5,471,125 A * | 11/1995 | Wu | .......................... | 318/803 |
| 5,790,396 A * | 8/1998 | Miyazaki et al. | .............. | 363/96 |
| 5,796,194 A * | 8/1998 | Archer et al. | ............ | 310/68 B |
| 5,828,199 A * | 10/1998 | Tajima et al. | ............... | 318/779 |
| 5,834,910 A * | 11/1998 | Tsurumi et al. | .............. | 318/139 |
| 5,986,419 A * | 11/1999 | Archer et al. | ................ | 318/254 |
| 6,229,278 B1 | 5/2001 | Garces et al. | ................ | 318/801 |
| 6,414,455 B1 * | 7/2002 | Watson | ........................ | 318/432 |
| 6,477,067 B1 * | 11/2002 | Kerkman et al. | .............. | 363/41 |
| 6,528,964 B2 * | 3/2003 | Schulz et al. | ................ | 318/701 |
| 6,531,843 B2 * | 3/2003 | Iwaji et al. | ................... | 318/727 |
| 6,556,464 B2 * | 4/2003 | Sakai et al. | .................. | 363/132 |
| 6,696,812 B2 * | 2/2004 | Kaneko et al. | .............. | 318/700 |
| 6,777,907 B2 * | 8/2004 | Ho | ............................... | 318/801 |
| 2002/0060548 A1 * | 5/2002 | Iwaji et al. | ................... | 318/727 |
| 2002/0117990 A1 * | 8/2002 | Sawada et al. | .............. | 318/727 |
| 2002/0154526 A1 * | 10/2002 | Sakai et al. | .................. | 363/132 |
| 2002/0163319 A1 * | 11/2002 | Kaneko et al. | .............. | 318/727 |
| 2003/0039185 A1 * | 2/2003 | Ikawa et al. | ............. | 369/44.32 |
| 2003/0184170 A1 * | 10/2003 | Kurnia et al. | .............. | 310/68 B |

FOREIGN PATENT DOCUMENTS

| | | |
|---|---|---|
| JP | 2000-060175 A | 2/2000 |
| JP | 2002-084760 A | 3/2002 |

* cited by examiner

Fig. 29
Gate signal of U− 
DC link current 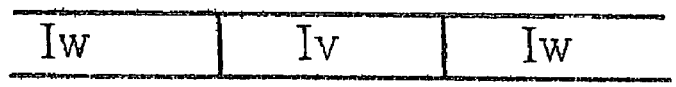

US 7,173,393 B2

PHASE CURRENT DETECTION METHOD, INVERTER CONTROL METHOD, MOTOR CONTROL METHOD, AND APPARATUSES USED IN THESE METHODS

This application is the national phase under 35 U.S.C. § 371 of PCT International Application No. PCT/JP02/10132 which has an International filing date of Sep. 27, 2002, which designated the United States of America.

TECHNICAL FIELD

The present invention relates to a phase current detection method, Inverter control method, motor control method and apparatus for carrying out these methods. More particularly, the present relates to a phase current detection method, inverter control method, motor control method and apparatus for carrying out these methods which are included in a motor driving apparatus for driving a motor by supplying output from a PWM inverter to the motor, and which are suitable for detecting phase current of the motor based upon a DC link current and a vector pattern to be applied and for carrying out current controlling or position-sensor-less controlling.

RELATED ART

From the past, it is generally carried out that motor phase currents are detected so as to perform current controlling, in a motor driving apparatus for driving a motor by supplying output from a PWM inverter to the motor.

For detecting phase currents of a motor, the following methods are proposed.

(1) A method for detecting a phase current using a DC current transformer; and
(2) A method for detecting a phase current based upon a voltage between terminals of a shunt resistor.

A disadvantage arises in that the motor driving apparatus is increased its cost in its entirety because the DC current transformer is expensive, when the method (1) is employed.

When the method (2) is employed, a pulse width becomes extremely thin depending upon the driving condition so that measurement error in phase current becomes greater. Therefore, restriction in pulse width is carried out so that the pulse width does not become thinner to some degree. When such measure is carried out, disadvantages arise in that a current waveform is distorted, and that a phase current is impossible to be detected at starting timing of a motor. Specifically, when a phase current is detected based upon an inverter input, as is illustrated in "Method For Detecting Three Phase Output Current Of PWM Inverter At DC Side", by Tanizawa et al., IEA-94-17 (hereinafter, referred to as cited document), a pulse width becomes thin at a portion in which phase voltage outputs are adjacent so that disadvantages arise in that great error is generated in phase current detection and that a phase current becomes impossible to be detected. Therefore, measures are considered that PWM is deformed at a portion where pulse width becomes thinner so as not to output pulses having a thin pulse width. But, a disadvantage arises in that a current waveform becomes distorted due to the deformation of PWM.

When a voltage is extremely low such as low speed rotation, the portion where pulse width is thin is expanded and is generated continuously with respect to a portion as a center where phase voltages are adjacent.

DISCLOSURE OF THE INVENTION

The present invention was made in view of the above problems.

A feature consistent with an embodiment of the present invention provides a phase current detection method, inverter control method, motor control method and apparatus for carrying out these methods which can realize decrease in cost, detect a phase current with stability at a desired timing, and greatly decrease distortion in voltage waveform.

One feature consistent with an embodiment of the invention detects a phase current of a motor based upon a DC link current and a vector pattern to be applied and which restricts the minimum pulse width, which method is included in a motor driving apparatus for driving a motor by supplying outputs from a PWM inverter to the motor, the method comprises adjusting a voltage to be applied by adding positive or reversed voltage in response to a fact that a desired duty has a small value.

Another feature consistent with an embodiment of the invention detects a phase current of a motor based upon a DC link current and a vector pattern to be applied and which restricts the minimum pulse width, which method is included in a motor driving apparatus for driving a motor by supplying outputs from a PWM inverter to the motor, the method comprises adjusting a voltage to be applied by varying a pulse application interval in response to a fact that a desired duty has a small value.

Another feature consistent with an embodiment of the invention detects a DC link current and calculates a phase current of a motor, which method is included in a motor driving apparatus for driving a motor by supplying outputs from a PWM inverter to the motor, the method comprises judging whether or not current detection is possible during the dead time, and carrying out current detection in response to the judgement result representing that current detection is possible.

Yet another feature consistent with an embodiment of the invention samples the current at the center of a period when a current corresponding to a voltage vector is observed through a shunt resistor.

Yet another feature consistent with an embodiment of the invention samples the current at the center of a period when a voltage vector is output.

Yet another feature consistent with an embodiment of the invention samples the current at the center of a period which is a period obtained by removing a period for hardware becoming stable starting of the period when a current corresponding to a voltage vector is observed through the shunt resistor, from the period when a current corresponding to a voltage vector is observed through the shunt resistor.

Yet another feature consistent with an embodiment of the invention samples the current at a timing which has passed a response time from the starting of the period in response to the fact that sampling at the center of the period is impossible due to the restriction of the response time.

Yet another feature consistent with an embodiment of the invention detects a phase current of a motor based upon a DC link current and a vector pattern to be applied, which method is included in a motor driving apparatus for driving a motor by supplying outputs from a PWM inverter to the motor, the method comprises estimating a current from the past current values in response to the fact that an applied voltage vector is too short to measure the current.

Yet another feature consistent with an embodiment of the invention detects a phase current of a motor based upon a DC link current and a vector pattern to be applied, which method is included in a motor driving apparatus for driving a motor by supplying outputs from a PWM inverter to the motor, the method comprises estimating a current value at a desired timing by correcting a current detection value using a current estimation value generated from the past current detection values.

Yet another feature consistent with an embodiment of the invention corrects the current detection value by adding an error current to the estimated current value at the desired timing.

Yet another feature consistent with an embodiment of the invention corrects the current detection value by operating an amplitude error from the error current and by adding the amplitude error to the estimated current of the desired timing.

Yet another feature consistent with an embodiment of the invention estimates the current value by employing previously described methods in response to the size of the amplitude.

Yet another feature consistent with an embodiment of the invention detects a phase current of a motor based upon a DC link current and a vector pattern to be applied, which method is included in a motor driving apparatus for driving a motor by supplying outputs from a PWM inverter to the motor, and which carries out current controlling or position-sensor-less controlling, the method comprises carrying out the controlling using the current measurement values at two current measurement timings within a carrier interval.

Yet another feature consistent with an embodiment of the invention includes an apparatus which detects a phase current of a motor based upon a DC link current and a vector pattern to be applied and which restricts the minimum pulse width, which apparatus is included in a motor driving apparatus for driving a motor by supplying outputs from a PWM inverter to the motor, the apparatus comprises, adjusting means for adjusting a voltage to be applied by adding positive or reversed voltage in response to a fact that a desired duty has a small value.

Yet another feature consistent with an embodiment of the invention includes an apparatus which detects a phase current of a motor based upon a DC link current and a vector pattern to be applied and which restricts the minimum pulse width, which apparatus is included in a motor driving apparatus for driving a motor by supplying outputs from a PWM inverter to the motor, the apparatus comprises, adjusting means for adjusting a voltage to be applied by varying a pulse application interval in response to a fact that a desired duty has a small value.

Yet another feature consistent with an embodiment of the invention includes an apparatus which detects a DC link current and calculates a phase current of a motor, which apparatus is included in a motor driving apparatus for driving a motor by supplying outputs from a PWM inverter to the motor, the apparatus comprises, current detection means for judging whether or not current detection is possible during the dead time, and for carrying out current detection in response to the judgement result representing that current detection is possible.

Yet another feature consistent with an embodiment of the invention includes an apparatus which employs means for sampling the current at the center of a period when a current corresponding to a voltage vector is observed through a shunt resistor, as the current detection means.

Yet another feature consistent with an embodiment of the invention includes an apparatus which employs means for sampling the current at the center of a period when a voltage vector is output, as the current detection means.

Yet another feature consistent with an embodiment of the invention includes an apparatus which employs means for sampling the current at the center of a period which is a period obtained by removing a period for hardware becoming stable starting of the period when a current corresponding to a voltage vector is observed through the shunt resistor, from the period when a current corresponding to a voltage vector is observed through the shunt resistor, as the current detection means.

Yet another feature consistent with an embodiment of the invention includes an apparatus which employs means for sampling the current at a timing which has passed a response time from the starting of the period in response to the fact that sampling at the center of the period is impossible due to the restriction of the response time, as the current detection means.

Yet another feature consistent with an embodiment of the invention includes an apparatus which detects a phase current of a motor based upon a DC link current and a vector pattern to be applied, which apparatus is included in a motor driving apparatus for driving a motor by supplying outputs from a PWM inverter to the motor, the apparatus comprises, current estimation means for estimating a current from the past current values in response to the fact that an applied voltage vector is too short to measure the current.

Yet another feature consistent with an embodiment of the invention includes an apparatus which detects a phase current of a motor based upon a DC link current and a vector pattern to be applied, which apparatus is included in a motor driving apparatus for driving a motor by supplying outputs from a PWM inverter to the motor, the apparatus comprises, current estimation means for estimating a current value at a desired timing by correcting a current detection value using a current estimation value generated from the past current detection values.

Yet another feature consistent with an embodiment of the invention includes an apparatus which employs means for correcting the current detection value by adding an error current to the estimated current value at the desired timing, as the current estimation means.

Yet another feature consistent with an embodiment of the invention includes an apparatus which employs means for correcting the current detection value by operating an amplitude error from the error current and by adding the amplitude error to the estimated current of the desired timing, as the current estimation means.

Yet another feature consistent with an embodiment of the invention includes an apparatus which employs means for calculating an amplitude error from the error current and for correcting the detection current value by adding the amplitude error to the estimation current of the desired timing, in response to the fact that the amplitude has a great value, and for correcting the current detection value by adding the error current to the estimation current value of the desired timing, in response to the fact that the amplitude has a small value, as the current estimation means.

Yet another feature consistent with an embodiment of the invention includes an apparatus which detects a phase current of a motor based upon a DC link current and a vector pattern to be applied, which apparatus is included in a motor driving apparatus for driving a motor by supplying outputs from a PWM inverter to the motor, and which carries out current controlling or position-sensor-less controlling, the apparatus comprises, control means for carrying out the controlling using the current measurement values at two current measurement timings within a carrier interval.

Yet another feature consistent with an embodiment of the invention detects a phase current of a motor based upon a DC link current and a vector pattern to be applied and which restricts the minimum pulse width, which method is included in a motor driving apparatus for driving a motor by supplying outputs from a PWM inverter to the motor, the method comprises estimating direction of the current at the current detection timing, and varying the minimum pulse width based upon the estimation result.

Yet another feature consistent with an embodiment of the invention employs a gate-pulse width as the pulse width.

Yet another feature consistent with an embodiment of the invention calculates a period when current appears on the DC link, from the current flowing direction and the vector pattern to be output, and determines the gate-pulse width so that the calculated period becomes the minimum vector output period for current detection on the DC link.

Yet another feature consistent with an embodiment of the invention estimates the pattern of switch operation for causing varying in output vector, and varies the minimum gate-pulse width based upon the estimation result.

Yet another feature consistent with an embodiment of the invention determines a response time in correspondence with the switching devices constituting the PWM inverter, and varies the minimum gate-pulse width to match the switching devices which cause current varying.

Yet another feature consistent with an embodiment of the invention estimates the direction of the current from the phase information of the current.

Yet another feature consistent with an embodiment of the invention estimates the direction of the current from the sequence of the current values.

Yet another feature consistent with an embodiment of the invention changes the processing for estimating the direction of the current from the phase information of the current and the processing for estimating the direction of the current from the sequence of the current values, in response with the rotation speed of the motor.

Yet another feature consistent with an embodiment of the invention applies pulse width restriction to the vector output period excluding the dead time, in response with the fact that the estimated current is within the current estimation error.

Yet another feature consistent with an embodiment of the invention turns off one of the switching devices constituting the PWM inverter for a time required for current detection.

Yet another feature consistent with an embodiment of the invention calculates a motor voltage from a DC link voltage and a gate-pulse width, detects a phase current from a DC link current and a vector pattern to be applied, and controls a motor based upon the calculated motor voltage and the detected phase current, the method comprises controlling the DC link voltage to be higher or lower in response with either condition of the voltage required by the motor is higher or lower, respectively.

Yet another feature consistent with an embodiment of the invention lowers the power factor and raises the output voltage or the output current when the rotation speed is lower or the load is lighter.

Yet another feature consistent with an embodiment of the invention calculates the switching pattern of the voltage varying timing from the direction of the current and the output vector pattern, calculates the delay time of the devices based upon the calculation result, and corrects the motor voltage.

Yet another feature consistent with an embodiment of the invention calculates the gate-pulse width so that the length of the command voltage vector and the vector output period are equal to one another, in response with the fact that the vector output period is longer than the minimum vector output period.

Yet another feature consistent with an embodiment of the invention connects the converter for carrying out switching operation to the PWM inverter in series, and prohibits switching of the converter and the PWM inverter at the current detection timing.

Yet another feature consistent with an embodiment of the invention detects the converter current and the inverter current by providing a current detection section which is in series with respect to the smoothing condenser on the DC link.

Yet another feature consistent with an embodiment of the invention includes an apparatus which detects a phase current of a motor based upon a DC link current and a vector pattern to be applied and which restricts the minimum pulse width, which apparatus is included in a motor driving apparatus for driving a motor by supplying outputs from a PWM inverter to the motor, the apparatus comprises, minimum pulse width varying means for estimating direction of the current at the current detection timing, and for varying the minimum pulse width based upon the estimation result.

Yet another feature consistent with an embodiment of the invention includes an apparatus which employs means for calculating the period when the current appears on the DC link from the current flowing direction and the vector pattern to be output, and for determining the gate-pulse width so that the calculated period becomes the minimum vector output period for current detection on the DC link, as the minimum pulse width varying means.

Yet another feature consistent with an embodiment of the invention includes an apparatus which employs means for estimating the pattern of switch operation for causing varying in output vector, and for varying the minimum gate-pulse width based upon the estimation result, as the minimum pulse width varying means.

Yet another feature consistent with an embodiment of the invention includes an apparatus which employs means for determining a response time in correspondence with the switching devices constituting the PWM inverter, and for varying the minimum gate-pulse width to match the switching devices which cause current varying, as the minimum pulse width varying means.

Yet another feature consistent with an embodiment of the invention includes an apparatus which employs means for estimating the direction of the current from the phase information of the current, as the minimum pulse width varying means.

Yet another feature consistent with an embodiment of the invention includes an apparatus which employs means for estimating the direction of the current from the sequence of the current values, as the minimum pulse width varying means.

Yet another feature consistent with an embodiment of the invention includes an apparatus which employs means for changing the processing for estimating the direction of the current from the phase information of the current and the processing for estimating the direction of the current from the sequence of the current values, in response with the rotation speed of the motor, as the minimum pulse width varying means.

Yet another feature consistent with an embodiment of the invention includes an apparatus which employs means for applying pulse width restriction to the vector output period excluding the dead time, in response with the fact that the estimated current is within the current estimation error, as the minimum pulse width varying means.

Yet another feature consistent with an embodiment of the invention includes an apparatus which employs means for turning off one of the switching devices constituting the PWM inverter for a time required for current detection, as the minimum pulse width varying means.

Yet another feature consistent with an embodiment of the invention includes an apparatus which calculates a motor voltage from a DC link voltage and a gate-pulse width, detects a phase current from a DC link current and a vector pattern to be applied, and for calculating controlling a motor based upon the calculated motor voltage and the detected phase current, the apparatus comprises, motor voltage control means for controlling the DC link voltage to be higher or lower in response with either condition of the voltage required by the motor is higher or lower, respectively.

Yet another feature consistent with an embodiment of the invention includes an apparatus which employs means for lowering the power factor and for raising the output voltage or the output current when the rotation speed is lower or the load is lighter, as the motor voltage control means.

Yet another feature consistent with an embodiment of the invention includes an apparatus which employs means for calculating the switching pattern of the voltage varying timing from the direction of the current and the output vector pattern, for calculating the delay time of the devices based upon the calculation result, and for correcting the motor voltage, as the motor voltage control means.

Yet another feature consistent with an embodiment of the invention includes an apparatus which employs means for calculating the gate-pulse width so that the length of the command voltage vector and the vector output period are equal to one another, in response with the fact that the vector output period is longer than the minimum vector output period, as the minimum pulse width varying means.

Yet another feature consistent with an embodiment of the invention includes an apparatus which connects the converter for carrying out switching operation to the PWM inverter in series, and employs means for prohibiting switching of the converter and the PWM inverter at the current detection timing, as the converter inverter control means.

Yet another feature consistent with an embodiment of the invention includes an apparatus which provides a current detection section which is in series with respect to the smoothing condenser on the DC link detects so that the converter current and the inverter current are detected.

When the phase current detection consistent with an embodiment of the invention is employed, and when the method detects a phase current of a motor based upon a DC link current and a vector pattern to be applied and which restricts the minimum pulse width, which method is included in a motor driving apparatus for driving a motor by supplying outputs from a PWM inverter to the motor, the method adjusts a voltage to be applied by adding positive or reversed voltage in response to a fact that a desired duty has a small value.

Therefore, a desired voltage can be obtained in average by applying a reverse voltage so as to suppress the distortion in voltage waveform when the output voltage becomes greater than the desired voltage value due to the limitation of the minimum vector output period.

When the phase current detection method consistent with another embodiment is employed, and when the method detects a phase current of a motor based upon a DC link current and a vector pattern to be applied and which restricts the minimum pulse width, which method is included in a motor driving apparatus for driving a motor by supplying outputs from a PWM inverter to the motor, the method adjusts a voltage to be applied by varying a pulse application interval in response to a fact that a desired duty has a small value.

Therefore, the voltage outputting too much due to enlarging in length is corrected so that the voltage vector having a length longer than that of the minimum voltage vector with the command current being made smaller its error, by enlarging the voltage vector up to the voltage vector having the minimum length and by prohibiting outputting of the voltage vector for a constant period thereafter when a short voltage vector command is input.

When the phase current detection method consistent with an embodiment of the invention is employed, and when the method detects a DC link current and calculates a phase current of a motor, which method is included in a motor driving apparatus for driving a motor by supplying outputs from a PWM inverter to the motor, the method judges whether or not current detection is possible during the dead time, and carries out current detection in response to the judgement result representing that current detection is possible.

Therefore, the phase current can be detected even during the dead time period.

When the phase current detection method consistent with an embodiment of the invention is employed, the method samples the current at the center of a period when a current corresponding to a voltage vector is observed through a shunt resistor. Therefore, the current can be detected at the timing when the nearly average current and the DC link current coincident to one another so that the higher harmonics error can be suppressed, in addition to the operation and effect similar to those consistent with other embodiments of the invention.

When the phase current detection method consistent with an embodiment of the invention is employed, the method samples the current at the center of a period when a voltage vector is output. Therefore, the processing can be simplified, in addition to the operation and effect similar to those consistent with other embodiments of the invention.

When the phase current detection method consistent with an embodiment of the invention is employed, the method samples the current at the center of a period which is a period obtained by removing a period for hardware becoming stable starting of the period when a current corresponding to a voltage vector is observed through the shunt resistor, from the period when a current corresponding to a voltage vector is observed through the shunt resistor. Therefore, the affection for the period when the hardware is not stable can securely be eliminated, in addition to the operation and effect similar to those consistent with other embodiments of the invention.

When the phase current detection method consistent with an embodiment of the invention is employed, the method samples the current at a timing which has passed a response time from the starting of the period in response to the fact that sampling at the center of the period is impossible due to the restriction of the response time. Therefore, the phase current can be detected with accuracy even when the response time is long, in addition to the operation and effect similar to those consistent with other embodiments of the invention.

When the phase current detection method consistent with an embodiment of the invention is employed, and when the method detects a phase current of a motor based upon a DC link current and a vector pattern to be applied, which method is included in a motor driving apparatus for driving a motor by supplying outputs from a PWM inverter to the motor, the method estimates a current from the past current values in response to the fact that an applied voltage vector is too short to measure the current.

Therefore, the phase current with accuracy to some degree can be employed even when accurate current measurement cannot be carried out.

When the phase current detection method consistent with an embodiment of the invention is employed, and when the method detects a phase current of a motor based upon a DC link current and a vector pattern to be applied, which method is included in a motor driving apparatus for driving a motor by supplying outputs from a PWM inverter to the motor, the method estimates a current value at a desired timing by correcting a current detection value using a current estimation value generated from the past current detection values.

Therefore, the phase current value with little error can be obtained even when the detection time and the current obtaining timing are different from one another.

When the phase current detection method consistent with an embodiment of the invention is employed, the method corrects the current detection value by adding an error current to the estimated current value at the desired timing. Therefore, the operation and effect similar to those consistent with other embodiments of the invention are realized by carrying out the simple operation.

When the phase current detection method of consistent with an embodiment of the invention is employed, the method corrects the current detection value by operating an amplitude error from the error current and by adding the amplitude error to the estimated current of the desired timing. Therefore, the operation and effect similar to those consistent with other embodiments of the invention are realized.

When the phase current detection method consistent with an embodiment of the invention is employed, the method estimates the current value by em in the method consistent with other embodiments of the invention in response to the size of the amplitude. Therefore, good phase current estimation can always be realized.

When the inverter control method consistent with an embodiment of the invention is employed, and when the method detects a phase current of a motor based upon a DC link current and a vector pattern to be applied, which method is included in a motor driving apparatus for driving a motor by supplying outputs from a PWM inverter to the motor, and which carries out current controlling or position-sensor-less controlling, the method carries out the controlling using the current measurement values at two current measurement timings within a carrier interval.

Therefore, the current controlling following the current command can be realized and the controlling speed of the current controlling loop can be raised.

When the phase current detection apparatus consistent with an embodiment of the invention is employed, and when the apparatus detects a phase current of a motor based upon a DC link current and a vector pattern to be applied and which restricts the minimum pulse width, which apparatus is included in a motor driving apparatus for driving a motor by supplying outputs from a PWM inverter to the motor, the apparatus adjusts a voltage to be applied by adding positive or reversed voltage in response to a fact that a desired duty has a small value by the adjusting means.

Therefore, a desired voltage can be obtained in average by applying a reverse voltage so as to suppress the distortion in voltage waveform when the output voltage becomes greater than the desired voltage value due to the limitation of the minimum vector output period.

When the phase current detection apparatus consistent with an embodiment of the invention is employed, and when the apparatus detects a phase current of a motor based upon a DC link current and a vector pattern to be applied and which restricts the minimum pulse width, which apparatus is included in a motor driving apparatus for driving a motor by supplying outputs from a PWM inverter to the motor, the apparatus adjusts a voltage to be applied by varying a pulse application interval in response to a fact that a desired duty has a small value by the adjusting means.

Therefore, the voltage outputting too much due to enlarging in length is corrected so that the voltage vector having a length longer than that of the minimum voltage vector with the command current being made smaller its error, by enlarging the voltage vector up to the voltage vector having the minimum length and by prohibiting outputting of the voltage vector for a constant period thereafter when a short voltage vector command is input.

When the phase current detection apparatus consistent with an embodiment of the invention is employed, and when the apparatus detects a DC link current and calculates a phase current of a motor, which apparatus is included in a motor driving apparatus for driving a motor by supplying outputs from a PWM inverter to the motor, the apparatus judges whether or not current detection is possible during the dead time, and carries out current detection in response to the judgement result representing that current detection is possible, by the current detection means.

Therefore, the phase current can be detected even during the dead time period.

When the phase current detection apparatus consistent with an embodiment of the invention is employed, the apparatus employs means for sampling the current at the center of a period when a current corresponding to a voltage vector is observed through a shunt resistor, as the current detection means. Therefore, the current can be detected at the timing when the nearly average current and the DC link current coincident to one another so that the higher harmonics error can be suppressed, in addition to the operation and effect similar to those consistent with other embodiments of the invention.

When the phase current detection apparatus consistent with an embodiment of the invention is employed, the apparatus employs means for sampling the current at the center of a period when a voltage vector is output, as the current detection means. Therefore, the processing can be simplified, in addition to the operation and effect similar to those consistent with other embodiments of the invention.

When the phase current detection apparatus consistent with an embodiment of the invention is employed, the apparatus employs means for sampling the current at the center of a period which is a period obtained by removing a period for hardware becoming stable starting of the period when a current corresponding to a voltage vector is observed through the shunt resistor, from the period when a current corresponding to a voltage vector is observed through the shunt resistor, as the current detection means. Therefore, the affection for the period when the hardware is not stable can securely be eliminated, in addition to the operation and effect similar to those consistent with other embodiments of the invention.

When the phase current detection apparatus consistent with an embodiment of the invention is employed, the apparatus employs means for sampling the current at a timing which has passed a response time from the starting of the period in response to the fact that sampling at the center of the period is impossible due to the restriction of the response time, as the current detection means. Therefore, the phase current can be detected with accuracy even when the response time is long, in addition to the operation and effect similar to those consistent with other embodiments of the invention.

When the phase current detection apparatus consistent with an embodiment of the invention is employed, and when the apparatus detects a phase current of a motor based upon a DC link current and a vector pattern to be applied, which apparatus is included in a motor driving apparatus for driving a motor by supplying outputs from a PWM inverter to the motor, the apparatus estimates a current from the past current values in response to the fact that an applied voltage vector is too short to measure the current by the current estimation means.

Therefore, the phase current with accuracy to some degree can be employed even when accurate current measurement cannot be carried out.

When the phase current detection apparatus consistent with an embodiment of the invention is employed, and when the apparatus detects a phase current of a motor based upon a DC link current and a vector pattern to be applied, which apparatus is included in a motor driving apparatus for driving a motor by supplying outputs from a PWM inverter to the motor, the apparatus estimates a current value at a desired timing by correcting a current detection value using a current estimation value generated from the past current detection values by the current estimation means.

Therefore, the phase current value with little error can be obtained even when the detection time and the current obtaining timing are different from one another.

When the phase current detection apparatus consistent with an embodiment of the invention is employed, the apparatus employs means for correcting the current detection value by adding an error current to the estimated current value at the desired timing, as the current estimation means. Therefore, the operation and effect similar to those consistent with other embodiments of the invention are realized by carrying out the simple operation.

When the phase current detection apparatus consistent with an embodiment of the invention is employed, the apparatus employs means for correcting the current detection value by operating an amplitude error from the error current and by adding the amplitude error to the estimated current of the desired timing, as the current estimation means. Therefore, the operation and effect similar to those consistent with other embodiments of the invention are realized.

When the phase current detection apparatus consistent with an embodiment of the invention is employed, the apparatus employs means for calculating an amplitude error from the error current and for correcting the detection current value by adding the amplitude error to the estimation current of the desired timing, in response to the fact that the amplitude has a great value, and for correcting the current detection value by adding the error current to the estimation current value of the desired timing, in response to the fact that the amplitude has a small value, as the current estimation means. Therefore, good phase current estimation can always be realized.

When the inverter control apparatus consistent with an embodiment of the invention is employed, and when the apparatus detects a phase current of a motor based upon a DC link current and a vector pattern to be applied, which apparatus is included in a motor driving apparatus for driving a motor by supplying outputs from a PWM inverter to the motor, and which carries out current controlling or position-sensor-less controlling, the apparatus carries out the controlling using the current measurement values at two current measurement timings within a carrier interval by the control means.

Therefore, the current controlling following the current command can be realized and the controlling speed of the current controlling loop can be raised.

When the phase current detection method consistent with an embodiment of the invention is employed, and when the method detects a phase current of a motor based upon a DC link current and a vector pattern to be applied and which restricts the minimum pulse width, which method is included in a motor driving apparatus for driving a motor by supplying outputs from a PWM inverter to the motor, the method estimates direction of the current at the current detection timing, and varies the minimum pulse width based upon the estimation result. Therefore, the secure detection of the phase current is realized.

When the phase current detection method consistent with an embodiment of the invention is employed, the method employs a gate-pulse width as the pulse width. Therefore, the operation and effect similar to those consistent with other embodiments of the invention are realized based upon the gate-pulse width.

When the phase current detection method consistent with an embodiment of the invention is employed, the method calculates a period when current appears on the DC link, from the current flowing direction and the vector pattern to be output, and determines the gate-pulse width so that the calculated period becomes the minimum vector output period for current detection on the DC link. Therefore, the secure detection of the phase current is realized.

When the phase current detection method consistent with an embodiment of the invention is employed, the method estimates the pattern of switch operation for causing varying in output vector, and varies the minimum gate-pulse width based upon the estimation result. Therefore, the secure detection of the phase current is realized.

When the phase current detection method consistent with an embodiment of the invention is employed, the method determines a response time in correspondence with the switching devices constituting the PWM inverter, and varies the minimum gate-pulse width to match the switching devices which cause current varying. Therefore, the minimum gate-pulse width can be determined by taking the response time for each switching device into consideration so that the operation and effect similar to those consistent with other embodiments of the invention are realized.

When the phase current detection method consistent with an embodiment of the invention is employed, the method estimates the direction of the current from the phase information of the current. Therefore, the direction of the current can be estimated with high accuracy even when the motor rotates at high speed so that the operation and effect similar to those consistent with other embodiments of the invention are realized.

When the phase current detection method consistent with an embodiment of the invention is employed, the method estimates the direction of the current from the sequence of the current values. Therefore, the direction of the current can be estimated with high accuracy even when the motor rotates at low speed and when the motor torque is controlled at high speed so that the operation and effect similar to those consistent with other embodiments of the invention are realized.

When the phase current detection method consistent with an embodiment of the invention is employed, the method changes the processing for estimating the direction of the current from the phase information of the current and the processing for estimating the direction of the current from the sequence of the current values, in response with the rotation speed of the motor. Therefore, the direction of the current can always be estimated with high accuracy so that the operation and effect similar to those consistent with other embodiments of the invention are realized.

When the phase current detection method consistent with an embodiment of the invention is employed, the method applies pulse width restriction to the vector output period excluding the dead time, in response with the fact that the estimated current is within the current estimation error. Therefore, the current detection is securely realized so that the operation and effect similar to those consistent with other embodiments of the invention are realized.

When the phase current detection method consistent with an embodiment of the invention is employed, the method turns off one of the switching devices constituting the PWM inverter for a time required for current detection. Therefore, the current detection can be realized with minimum voltage drop even when only one vector is continued to be output within a carrier interval such as maximum voltage outputting, so that the operation and effect similar to those consistent with other embodiments of the invention are realized.

When the motor controlling method consistent with an embodiment of the invention is employed, and when the method calculates a motor voltage from a DC link voltage and a gate-pulse width, detects a phase current from a DC link current and a vector pattern to be applied, and controls a motor based upon the calculated motor voltage and the detected phase current, the method controls the DC link voltage to be higher or lower in response with either condition of the voltage required by the motor is higher or lower, respectively. Therefore, the motor can be controlled in stable condition so that the secure current detection can always be carried out while good waveform outputting can be carried out with little affection of the pulse width restriction.

When the motor controlling method consistent with an embodiment of the invention is employed, the method lowers the power factor and raises the output voltage or the output current when the rotation speed is lower or the load is lighter. Therefore, the current detection can be carried out with ease, in addition to the operation and effect similar to those consistent with other embodiments of the invention.

When the motor controlling method consistent with an embodiment of the invention is employed, the method calculates the switching pattern of the voltage varying timing from the direction of the current and the output vector pattern, calculates the delay time of the devices based upon the calculation result, and corrects the motor voltage. Therefore, the voltage detection with high accuracy is realized.

When the phase current detection method consistent with an embodiment of the invention is employed, the method calculates the gate-pulse width so that the length of the command voltage vector and the vector output period are equal to one another, in response with the fact that the vector output period is longer than the minimum vector output period. Therefore, the current detection can securely be realized with suppression of distortion in waveform, in addition to the operation and effect similar to those consistent with other embodiments of the invention.

When the phase current detection method consistent with an embodiment of the invention is employed, the method connects the converter for carrying out switching operation to the PWM inverter in series, and prohibits switching of the converter and the PWM inverter at the current detection timing. Therefore, the current detection can be realized by removing the affection of noise.

When the phase current detection method consistent with an embodiment of the invention is employed, the method detects the converter current and the inverter current by providing a current detection section which is in series with respect to the smoothing condenser on the DC link. Therefore, the arrangement can be simplified and the measure for noise can be realized with ease, in addition to the operation and effect similar to those consistent with other embodiments of the invention.

When the phase current detection apparatus consistent with an embodiment of the invention is employed, and when the apparatus detects a phase current of a motor based upon a DC link current and a vector pattern to be applied and which restricts the minimum pulse width, which apparatus is included in a motor driving apparatus for driving a motor by supplying outputs from a PWM inverter to the motor, the apparatus estimates direction of the current at the current detection timing, and varies the minimum pulse width based upon the estimation result by the minimum pulse width varying means. Therefore, the secure detection of the phase current is realized.

When the phase current detection apparatus consistent with an embodiment of the invention is employed, the apparatus employs means for calculating the period when the current appears on the DC link from the current flowing direction and the vector pattern to be output, and for determining the gate-pulse width so that the calculated period becomes the minimum vector output period for current detection on the DC link, as the minimum pulse width varying means. Therefore, the secure detection of the phase current is realized.

When the phase current detection apparatus consistent with an embodiment of the invention is employed, the apparatus employs means for estimating the pattern of switch operation for causing varying in output vector, and for varying the minimum gate-pulse width based upon the estimation result, as the minimum pulse width varying means. Therefore, the secure detection of the phase current is realized.

When the phase current detection apparatus consistent with an embodiment of the invention is employed, the apparatus employs means for determining a response time in correspondence with the switching devices constituting the PWM inverter, and for varying the minimum gate-pulse width to match the switching devices which cause current varying, as the minimum pulse width varying means. Therefore, the minimum gate-pulse width can be determined by taking the response time for each switching device into consideration so that the operation and effect similar to those consistent with other embodiments of the invention are realized.

When the phase current detection apparatus consistent with an embodiment of the invention is employed, the apparatus employs means for estimating the direction of the current from the phase information of the current, as the minimum pulse width varying means. Therefore, the direction of the current can be estimated with high accuracy even when the motor rotates at high speed so that the operation and effect similar to those consistent with other embodiments of the invention are realized.

When the phase current detection apparatus consistent with an embodiment of the invention is employed, the apparatus which employs means for estimating the direction of the current from the sequence of the current values, as the minimum pulse width varying means. Therefore, the direction of the current can be estimated with high accuracy even when the motor rotates at low speed and when the motor torque is controlled at high speed so that the operation and effect similar to those consistent with other embodiments of the invention are realized.

When the phase current detection apparatus consistent with an embodiment of the invention is employed, the apparatus employs means for changing the processing for estimating the direction of the current from the phase information of the current and the processing for estimating the direction of the current from the sequence of the current values, in response with the rotation speed of the motor, as the minimum pulse width varying means. Therefore, the direction of the current can always be estimated with high accuracy so that the operation and effect similar to those consistent with other embodiments of the invention are realized.

When the phase current detection apparatus consistent with an embodiment of the invention is employed, the apparatus employs means for applying pulse width restriction to the vector output period excluding the dead time, in response with the fact that the estimated current is within the current estimation error, as the minimum pulse width varying means. Therefore, the current detection is securely realized so that the operation and effect similar to those consistent with other embodiments of the invention are realized.

When the phase current detection apparatus consistent with an embodiment of the invention is employed, the apparatus employs means for turning off one of the switching devices constituting the PWM inverter for a time required for current detection, as the minimum pulse width varying means. Therefore, the current detection can be realized with minimum voltage drop even when only one vector is continued to be output within a carrier interval such as maximum voltage outputting, so that the operation and effect similar to those consistent with other embodiments of the invention are realized.

When the motor controlling apparatus consistent with an embodiment of the invention is employed, and when the apparatus calculates a motor voltage from a DC link voltage and a gate-pulse width, detects a phase current from a DC link current and a vector pattern to be applied, and for calculating controlling a motor based upon the calculated motor voltage and the detected phase current, the apparatus controls the DC link voltage to be higher or lower in response with either condition of the voltage required by the motor is higher or lower, respectively, by the motor voltage control means.

Therefore, the motor can be controlled in stable condition so that the secure current detection can always be carried out while good waveform outputting can be carried out with little affection of the pulse width restriction.

When the motor controlling apparatus consistent with an embodiment of the invention is employed, the apparatus employs means for lowering the power factor and for raising the output voltage or the output current when the rotation speed is lower or the load is lighter, as the motor voltage control means. Therefore, the current detection can be carried out with ease, in addition to the operation and effect similar to those consistent with other embodiments of the invention.

When the motor controlling apparatus consistent with an embodiment of the invention is employed, the apparatus employs means for calculating the switching pattern of the voltage varying timing from the direction of the current and the output vector pattern, for calculating the delay time of the devices based upon the calculation result, and for correcting the motor voltage, as the motor voltage control means. Therefore, the voltage detection with high accuracy is realized.

When the phase current detection apparatus consistent with an embodiment of the invention is employed, the apparatus employs means for calculating the gate-pulse width so that the length of the command voltage vector and the vector output period are equal to one another, in response with the fact that the vector output period is longer than the minimum vector output period, as the minimum pulse width varying means. Therefore, the current detection can securely be realized with suppression of distortion in waveform, in addition to the operation and effect similar to those consistent with other embodiments of the invention.

When the phase current detection apparatus consistent with an embodiment of the invention is employed, the apparatus connects the converter for carrying out switching operation to the PWM inverter in series, and employs means for prohibiting switching of the converter and the PWM inverter at the current detection timing, as the converter inverter control means. Therefore, the current detection can be realized by removing the affection of noise.

When the phase current detection apparatus consistent with an embodiment of the invention is employed, the apparatus provides a current detection section which is in series with respect to the smoothing condenser on the DC link detects so that the converter current and the inverter current are detected. Therefore, the arrangement can be simplified and the measure for noise can be realized with ease, in addition to the operation and effect similar to those consistent with other embodiments of the invention.

BRIEF DESCRIPTION OF THE DRAWINGS

FIG. 29 is a schematic diagram illustrating the processing of a preferred example for turning off the switching device for current detection;

BEST MODE FOR CARRYING OUT THE INVENTION

Hereinafter, referring to the attached drawings, we explain the embodiments of the phase current detection method, inverter controlling method and apparatus thereof according to the present invention.

Figure 1:
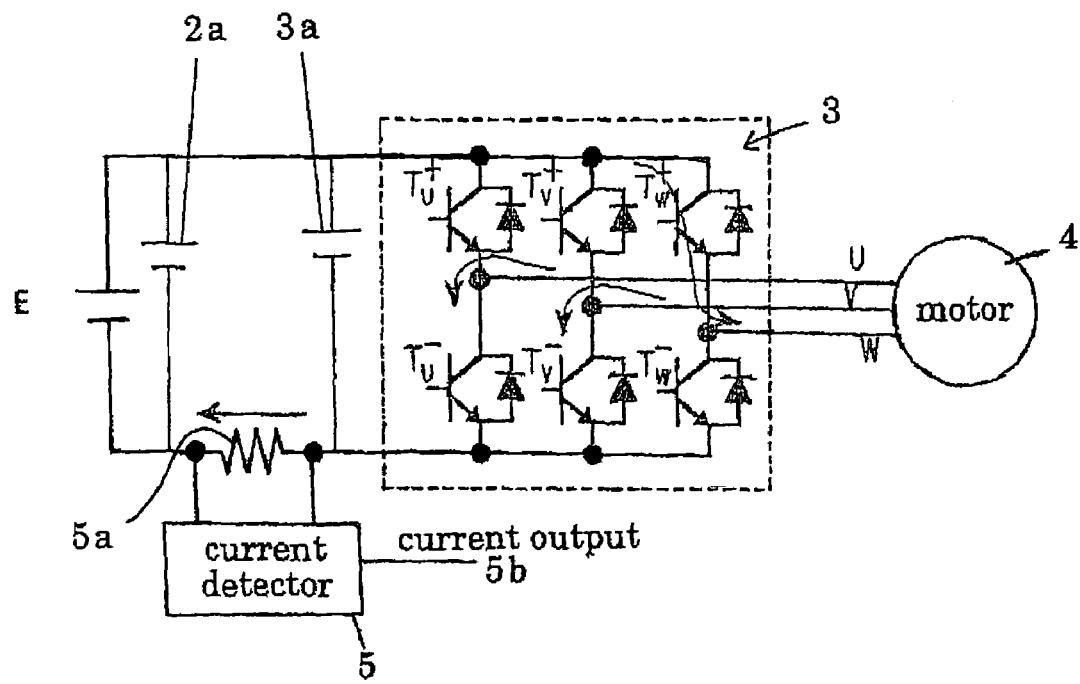
FIG. 1 is a diagram illustrating an arrangement of a motor driving apparatus using an inverter.

FIG. 1 is a diagram illustrating an arrangement of a motor driving apparatus using an inverter. Table 1 represents a relationship between an output voltage vector of an inverter (power devices) and a switching condition of a switching device.

TABLE 1

|  | $T_u^+$ | $T_v^+$ | $T_w^+$ |
|---|---|---|---|
| V0 | OFF | OFF | OFF |
| V1 | OFF | OFF | ON |
| V2 | OFF | ON | OFF |
| V3 | OFF | ON | ON |
| V4 | ON | OFF | OFF |
| V5 | ON | OFF | ON |
| V6 | ON | ON | OFF |
| V7 | ON | ON | ON |

Wherein, $T_u^+$, $T_v^+$ and $T_w^+$ represent switching devices of upper arm of u-phase, v-phase and w-phase, respectively. Ts+MAX(Toff)represent switching devices of lower arm of u-phase, v-phase and w-phase, respectively. In Table 1, ON represents a condition that the switching device of upper arm is ON and the switching device of lower arm is OFF, and OFF represents a condition that the switching device of upper arm is OFF and the switching device of lower arm is ON.

In the above motor driving apparatus, a first condenser 2a is connected between output terminals of a DC power supply E, a three phase inverter 3 is connected in parallel to the first condenser 2a, and the output of the three phase inverter 3 is supplied to a motor 4. A current detector 5 is connected between the input side of the three phase inverter 3 and the first condenser 2a.

This current detector 5 has a shunt resistor 5a and a current output section 5b. The shunt resistor 5a is interposed in a wiring between the first condenser 2a and a second condenser 3a. The current output section 5b receives the voltage between the terminals of the shunt resistor 5a and outputs it as a detected current.

When the voltage vector is V0, or V7, all terminals of the motor 4 are connected to the − line or + line of the power so that voltage for increasing or decreasing current (hereinafter, referred to simply as voltage) is not applied to the motor 4. When the voltage vector is V1, the w-phase terminal of the motor is connected to the + line of the power while other phase terminals are connected to the − line of the power so that the voltage is applied in a direction to increase the w-phase current (u-phase and v-phase are in negative direction).

When PWM (pulse width modulation) is employed, a magnitude of a voltage is determined based upon a ratio of outputting time of voltage vectors within a carrier. Therefore, a voltage vector having a very short period corresponding to a voltage difference between phases (hereinafter, referred to as "voltage vector is short") is output when the voltage of each phase is nearly equal to one another. When an output voltage is low, extremely short voltage vector is output so that the voltage vector V0 or V7 which applies no voltage to the motor 4 occupies most period within a carrier.

Figure 2:
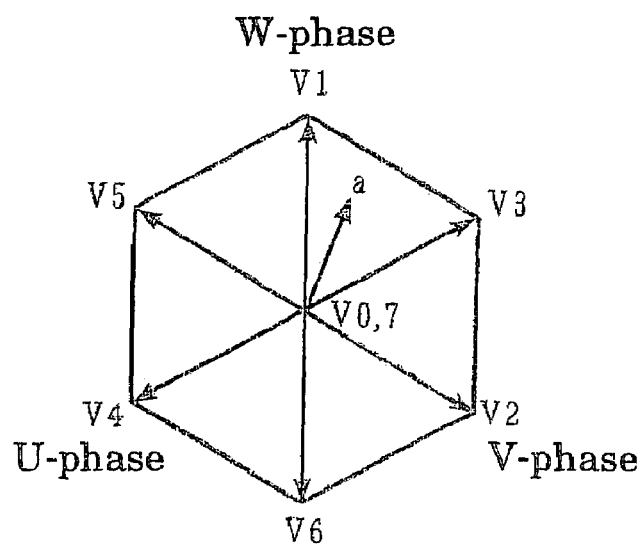
FIG. 2 is a diagram illustrating a relationship between a voltage vector and phase voltage.

FIG. 2 illustrates the application voltage to the motor 4 in two dimension. A case is defined to as u-phase direction that the positive voltage is applied to u-phase while the negative voltage is applied to v-phase and w-phase. Similarly, v-phase direction and w-phase direction are defined. And, the magnitude of the voltage is represented with the length of the vector.

In this case, voltage vectors V0~V7 are disposed as are illustrated in FIG. 2. When a-vector between the voltage vector V1 and the voltage vector V3 is output, for example, the voltage vector is changed and is output suitably in the order of V0, V1, V3, V7, for example, in the generic spatial vector method.

When the output voltage is made to be smaller (the length of the vector is shortened), the output time of the voltage vector V0, V7 is lengthened, and it is sufficient that the ratio of the output times of the voltage vector V1, V3 is maintained to be constant value for keeping the direction of the a-vector.

Figure 3:
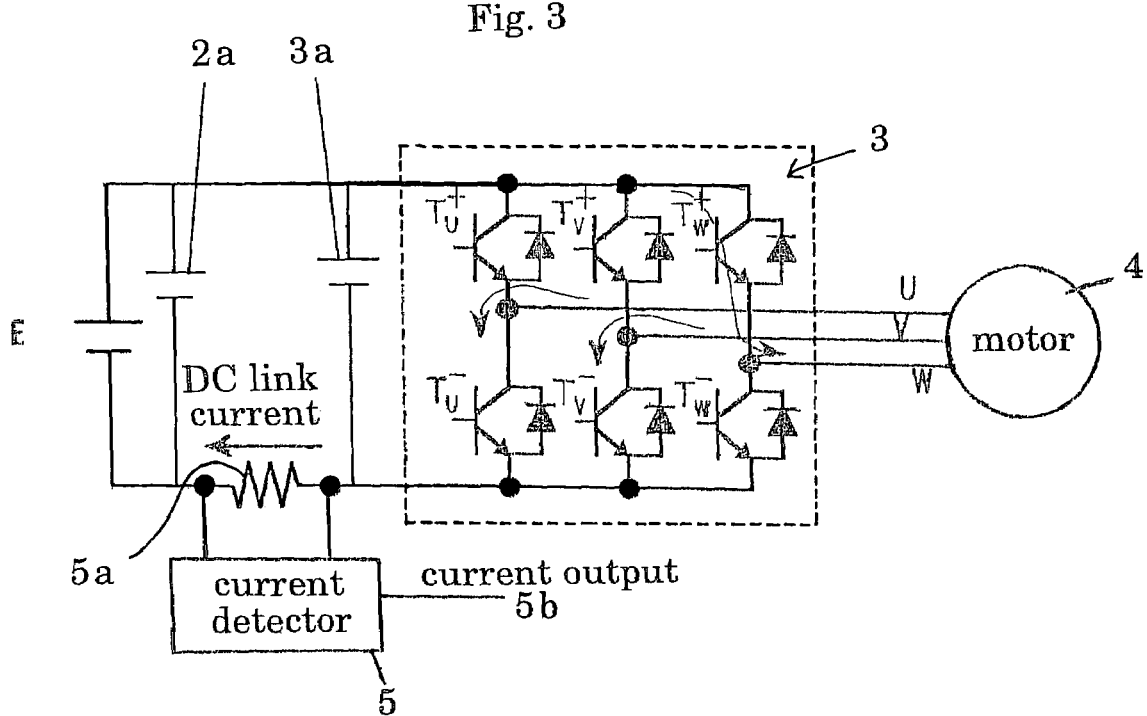
FIG. 3 is a diagram useful in understanding a current when the voltage vector V1 is output.
Figure 4:
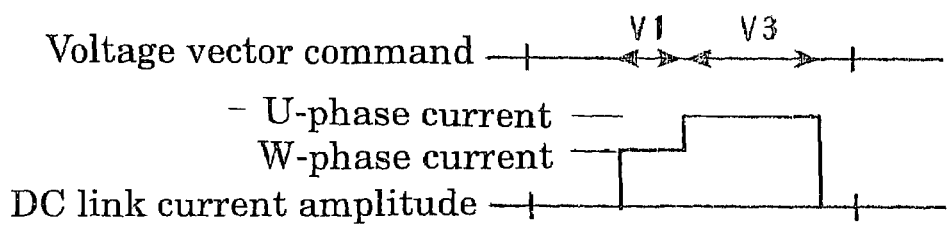
FIG. 4 is a diagram useful in understanding a current flowing in the DC link.

The phase current is detected from the DC link by using the characteristics that w-phase current flows the DC link for the period when the voltage vector V1 is output (refer to an arrow in FIG. 3), while the reversed in positive-negative current of the u-phase current flows the DC link for the period when the voltage vector V3 is output, when the a-vector is to be output, for example {refer to FIG. 4 and "detection method in DC side of the three phase output current of PWM inverter", Tanizawa et al., Iea-94-17 (hereinafter, referred to as reference document)}.

As is illustrated in the reference document, when the phase current of the motor is detected based upon the inverter input, the pulse width becomes narrower at the portion the phase voltage outputs are adjacent so that great error may be generated in the phase current or the phase current may become impossible to be detected. By taking this into consideration, measure is considered such that PWM is deformed at the portion where the pulse width becomes narrower so that pulses having thin pulse width are not output and the phase current is measured under this condition. But, the phenomenon of the pulse becoming narrower is generated continuously because the portion where the pulse width is thin is enlarged with respect to the portion as the center where the phase voltages are adjacent, when the voltage is extremely low such as low speed rotation. Therefore, it is difficult that driving the motor for the entire region of the motor driving extent only with the conventional measure.

When this disadvantage is taken into consideration, the desired voltage in average can be obtained by determining the minimum voltage vector output time when the low voltage where the voltage vector becomes shorter is required or the voltage difference between phases is smaller, and by applying the voltage of the reversed direction when the output voltage becomes greater than the predetermined voltage value due to the restriction of the minimum vector output time.

Figure 5:
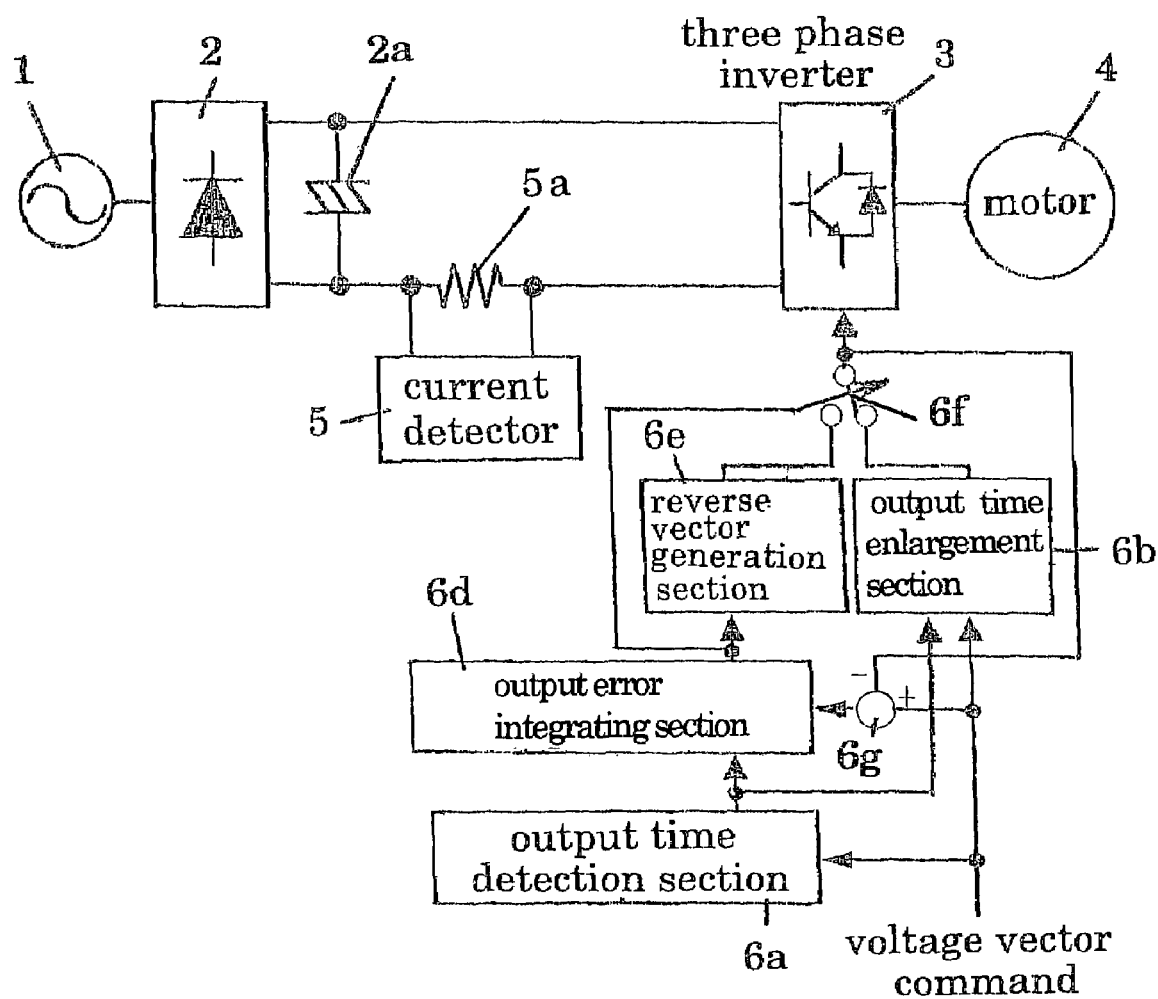
FIG. 5 is a block diagram illustrating a phase current detection apparatus of an embodiment according to the present invention.

FIG. 5 is a block diagram illustrating a phase current detection apparatus of an embodiment according to the present invention.

In this phase current detection apparatus, a first condenser 2a and three phase inverter 3 are connected between output terminals of a rectification circuitry 2 which receives AC power 1 as input, and the output of the three phase inverter 3 is supplied to a motor 4. And, a current detector 5 is provided between the input side of the three phase inverter 3 and the first condenser 2a.

The phase current detection apparatus comprises an output time detection section 6a, output time enlargement section 6b, subtraction section 6g, output error integrating section 6d, reverse vector generation section 6e, and selection section 6f.

The output time detection section 6a receives a voltage vector command as input, and detects a voltage vector which should be enlarged its output time.

The output time enlargement section 6b receives the voltage vector command and the voltage vector detected by the output time detection section 6a as input, and carries out enlargement processing for output time (enlarge the output time up to a length allowing the current detector 5 to detect the voltage vector).

The subtraction section 6g subtracts the length of actually output voltage vector from the voltage vector command, and outputs an error.

The output error integrating section 6d integrates the error from the subtraction section 6g and calculates an integrated error of an output with respect to the voltage vector command.

The reverse vector generation section 6e outputs a vector (reverse vector) which is obtained by replacing the ON/OFF in Table 1 for the enlarged voltage vector.

The selection section 6f carries out the replacing operation depending upon the sign of the integrated error from the output error integrating section 6d so as to select the output from the output time enlargement section 6b and the output from the reverse vector generation section 6e.

Figure 6:
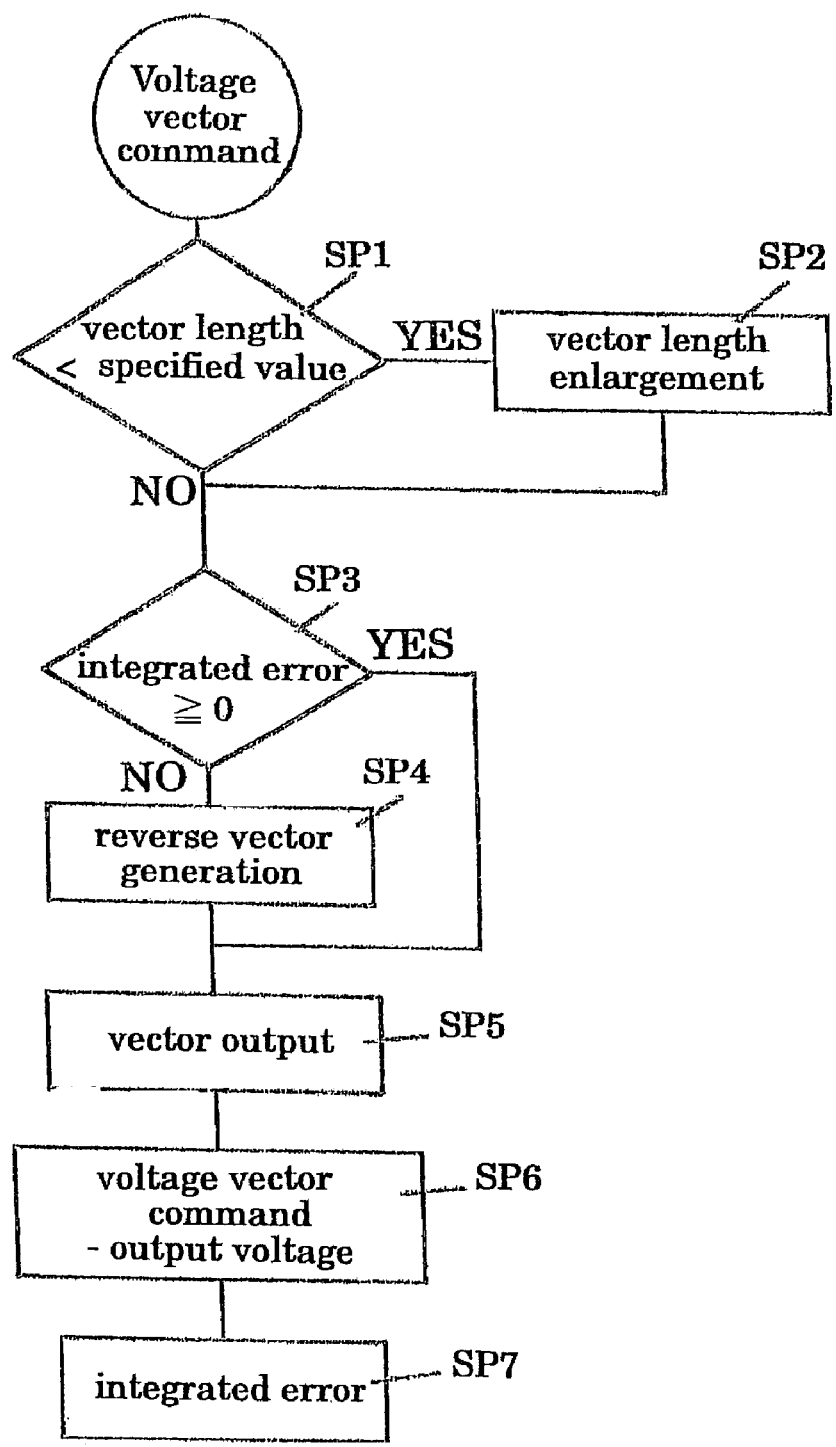
FIG. 6 is a flowchart useful in understanding a phase current detection method of an embodiment according to the present invention.

FIG. 6 is a flowchart useful in understanding a phase current detection method of an embodiment according to the present invention.

When a voltage vector command is given, in step SP1, it is judged whether or not a voltage vector length is smaller than a predetermined specified value. When it is judged that the voltage vector length is smaller than the predetermined specified value, in step SP2, a processing for enlarging a voltage vector length is carried out.

When it is judged that the voltage vector length is equal to or greater than the predetermined specified value, or when the processing of step SP2 is carried out, in step SP3, it is judged whether or not an integrated error is equal to or greater than 0. When the integrated error is less than 0, in step SP4, a reverse vector is generated.

When it is judged in step SP3 that the integrated error is equal to or greater than 0, or when the processing of step SP4 is carried out, in step SP5, a voltage vector is output. In step SP6, an output voltage is subtracted from the voltage vector command so as to calculate an error. In step SP7, the error is integrated. Then, the processing returns to the original processing.

Next, the operation and effect of the above phase current detection apparatus and method are described with reference to FIG. 7.

Figure 7:
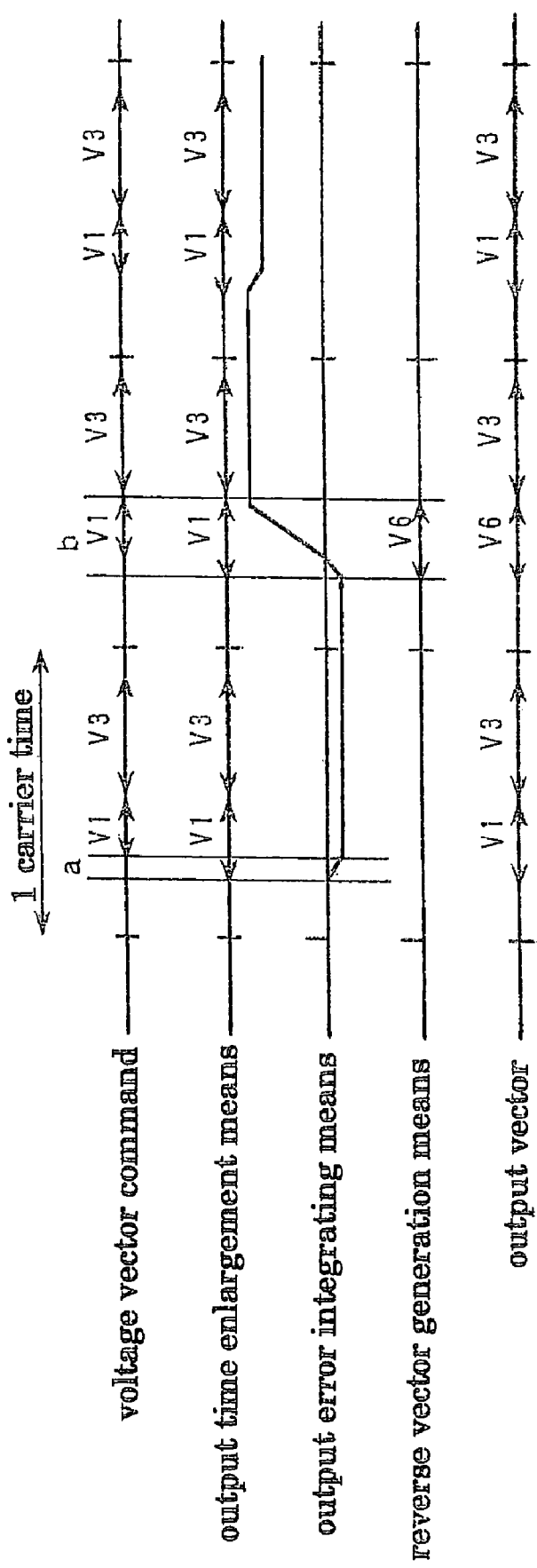
FIG. 7 is a diagram useful in understanding conceptual operation of the phase current detection apparatus of FIG. 5.

When a short voltage vector V1 is included in the voltage vector command, as is illustrated in FIG. 7, the output time enlargement section 6b enlarges the voltage vector V1 up to the minimum vector length based upon the output from the output time detection section 6a.

And, the generated error from this is integrated by the output error integrating section 6d (refer to section a in FIG. 7). Because the integration result is negative, the reverse vector generation section 6e generates the reverse vector V6 having the minimum vector length in next carrier (refer to section b in FIG. 7).

When this operation is carried out, the integrated error becomes positive so that the voltage vector V1 enlarged up to the minimum vector length is output again in next carrier.

As is described above, the voltage vector having a length equal to or longer than the minimum vector length is output while the error between the voltage vector and the voltage vector command is made to be smaller. As a result, detection accuracy of the phase current is improved.

Figure 8:
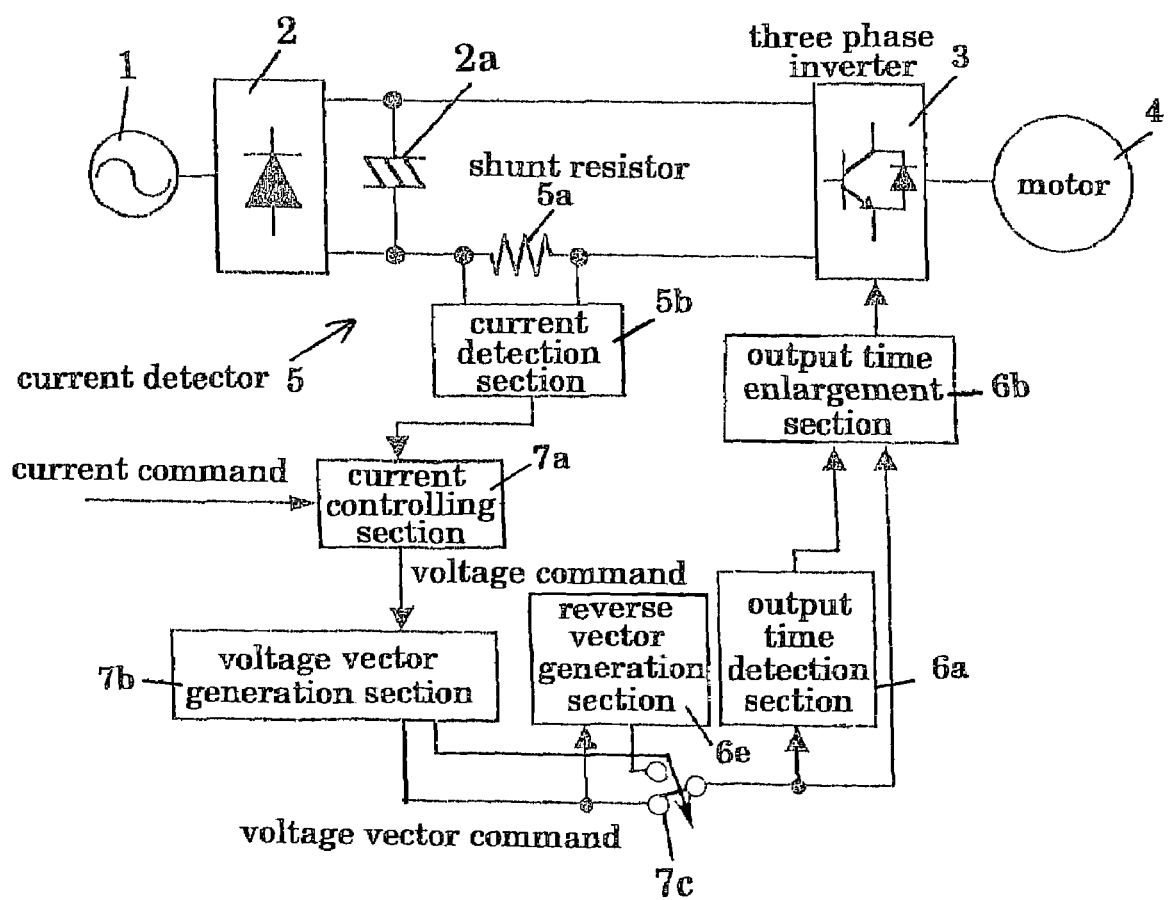
FIG. 8 is a block diagram illustrating a phase current detection apparatus of another embodiment according to the present invention.

FIG. 8 is a block diagram illustrating a phase current detection apparatus of another embodiment according to the present invention.

This phase current detection apparatus is different from the phase current detection apparatus of FIG. 5 in that the enlargement of the voltage vector length and outputting of the reverse vector are carried out based upon the difference between the current command and the motor current, instead the enlargement of the voltage vector length and outputting of the reverse vector based upon the integrated value of the error voltage. Wherein, the current flowing the coil is the integration of the voltage so that the operation and effect similar to those of the phase current detection apparatus of FIG. 5 can be realized using the phase current detection apparatus of FIG. 8.

Description is made further.

The phase current detection apparatus of FIG. 8 comprises a current controlling section 7a, voltage vector generation section 7b, reverse vector generation section 6e, selection section 7c, output time detection section 6a, and output time enlargement section 6b.

The current controlling section 7a receives the current command and the detected current from the current detector 5 as input, carries out the current controlling operation, and outputs the voltage command.

The voltage vector generation section 7b receives the voltage command as input, generates a voltage vector command from the phase angle and amplitude of the voltage command, and generates a changeover signal.

The reverse vector generation section 6e receives the voltage vector command as input, and outputs a reverse vector.

The selection section 7c selects one of the voltage vector command and the reverse vector based upon the changeover signal.

The output time detection section 6a receives the voltage vector command output from the selection section 7c as input, and detects a voltage vector which should be enlarged its output time.

The output time enlargement section 6b receives the voltage vector command and the voltage vector detected by the output time detection section 6a as input, and carries out enlargement processing for output time (enlarge the output time up to a length allowing the current detector 5 to detect the voltage vector).

When this phase current detection apparatus is employed, the voltage command is generated by the current controlling section 7a from the current command and detected current. And, the voltage vector generation section 7b generates the voltage vector command from the phase angle and amplitude of the voltage command.

But, the minimum vector length is restricted by the output time detection section 6a and output time enlargement section 6b. Therefore, a voltage actually applied to the motor 4 may become greater than this value so that the current may flow too much so as to mage the voltage command to be negative.

In this case, the voltage vector having a length equal to or longer than the minimum vector length while the difference between the current and the command current is made to be smaller by controlling the selection section 7c so as to output the reverse vector generated by the reverse vector generation section 6e.

Figure 9:
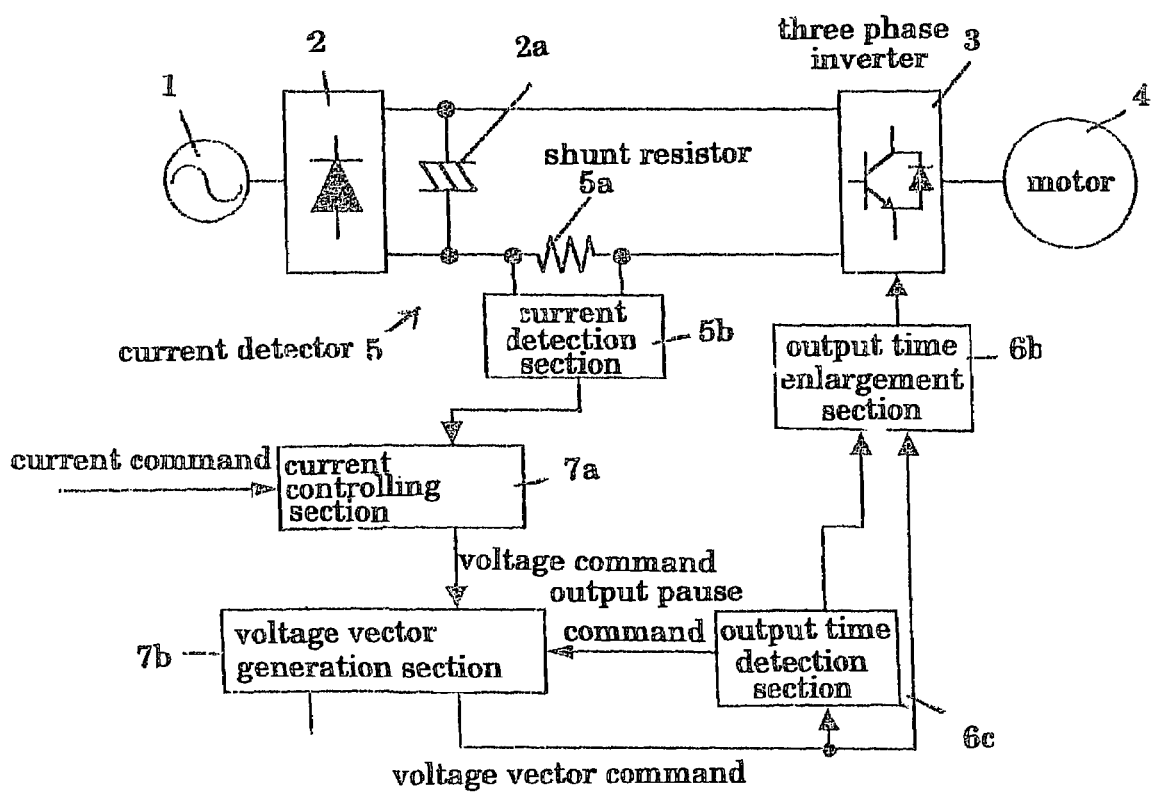
FIG. 9 is a block diagram illustrating a phase current detection apparatus of a further embodiment according to the present invention.

FIG. 9 is a block diagram illustrating a phase current detection apparatus of a further embodiment according to the present invention.

This phase current detection apparatus is different from the phase current detection apparatus of FIG. 8 in that a section for outputting only the voltage vector command is employed as the voltage vector generation section 7b, in that the selection section 7c is omitted, in that the reverse vector generation section 6e is omitted, in that a section for outputting also an output pause command and for supplying this output pause command to the voltage vector generation section 7b for a predetermined period (for example, 1 carrier) responding to the fact that the voltage vector shorter than the minimum vector length is employed as the output time detection section 6c.

Figure 10:
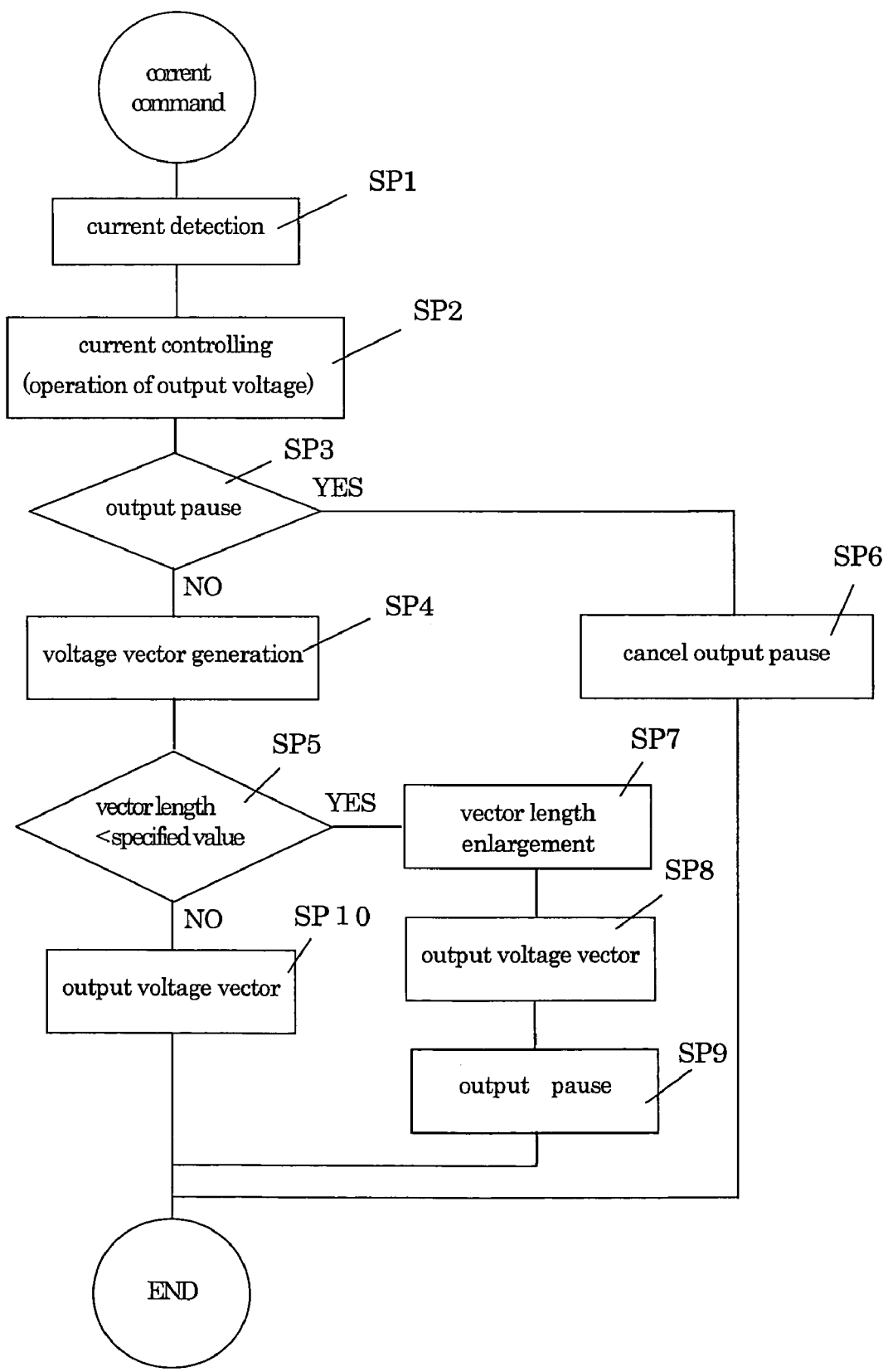
FIG. 10 is a flowchart useful in understanding a phase current detection method of a further embodiment according to the present invention.

FIG. 10 is a flowchart useful in understanding a phase current detection method of a further embodiment according to the present invention.

When a current command is given, in step SP1, a DC link current is detected by the current detector 5. In step SP2, the current controlling operation is carried out and the voltage command is obtained. In step SP3, it is judged whether or not the output pause is instructed.

When the output pause is not instructed, in step SP4, a voltage vector is generated. In step SP5, it is judged whether or not the voltage vector length is shorter than the specified value.

When it is judged in step SP3 that the output pause is instructed, in step SP6, output pause is canceled.

When it is judged in step SP5 that the voltage vector length is shorter than the specified value, in step SP7, the vector length is enlarged. In step SP8, the voltage vector is output. In step SP9, the output pause is instructed.

When it is judged in step SP5 that the voltage vector length is equal to or longer than the specified value, in step SP10, the voltage vector is output. And, when the processing of step SP6 is carried out, when the processing of step SP9 is carried out, or when the processing of step SP10 is carried out, the processing is returned to the original processing.

Next, the operation and effect of the above phase current detection apparatus and method are described with reference to FIG. 11.

Figure 11:
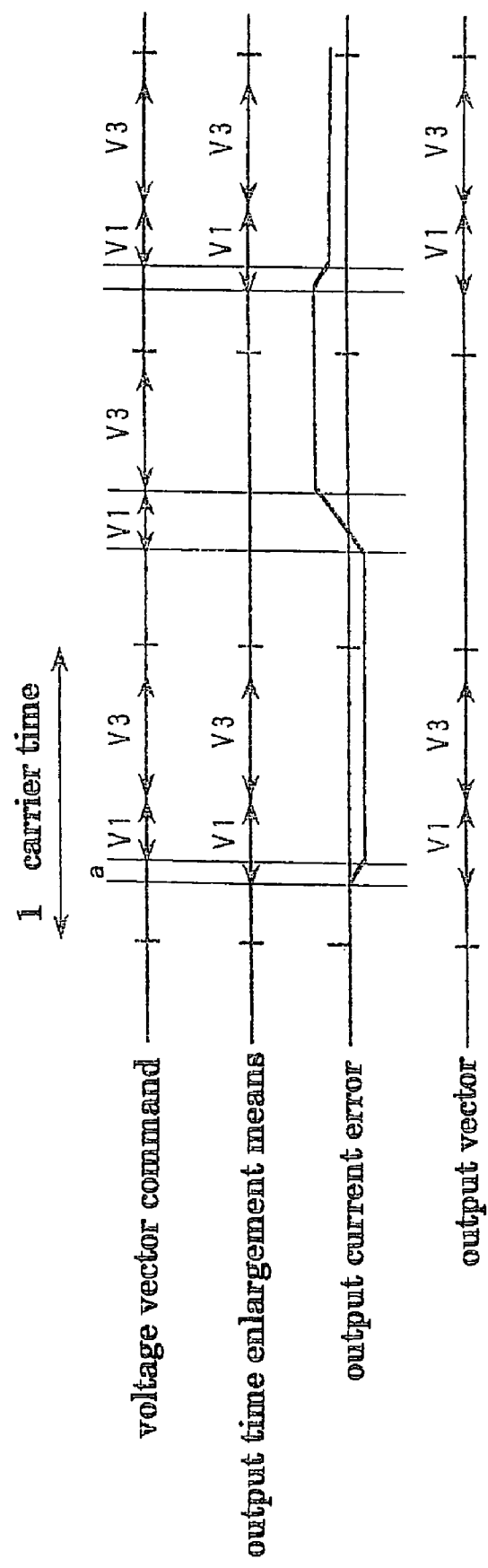
FIG. 11 is a diagram useful in understanding conceptual operation of the phase current detection apparatus of FIG. 9.

When a short voltage vector V1 is included in the voltage vector command, as is illustrated in FIG. 11, the output time enlargement section 6b enlarges the voltage vector V1 up to the minimum vector length based upon the output from the output time detection section 6a.

And, an error is generated in the output current due to this (refer to section a in FIG. 11).

The error in the output current is reduced, or the sign is reversed by pausing the output of the voltage vector in the carrier next to the enlargement of vector length.

The voltage vector is output again in next carrier.

The voltage vector having a length equal to or longer than the minimum vector length can be output while the error between the current and the current command can be made to be smaller by similarly pausing the output of the voltage vector for a carrier next to the enlargement of the voltage vector thereafter.

In this embodiment, the output pause time is determined to be 1 carrier. It is preferable that the output pause time is changed in response with the enlargement width, enlargement ratio in width of the voltage vector.

It is also possible that an integrated error obtained by integrating the error voltage is employed instead the current deviation.

Figure 12:
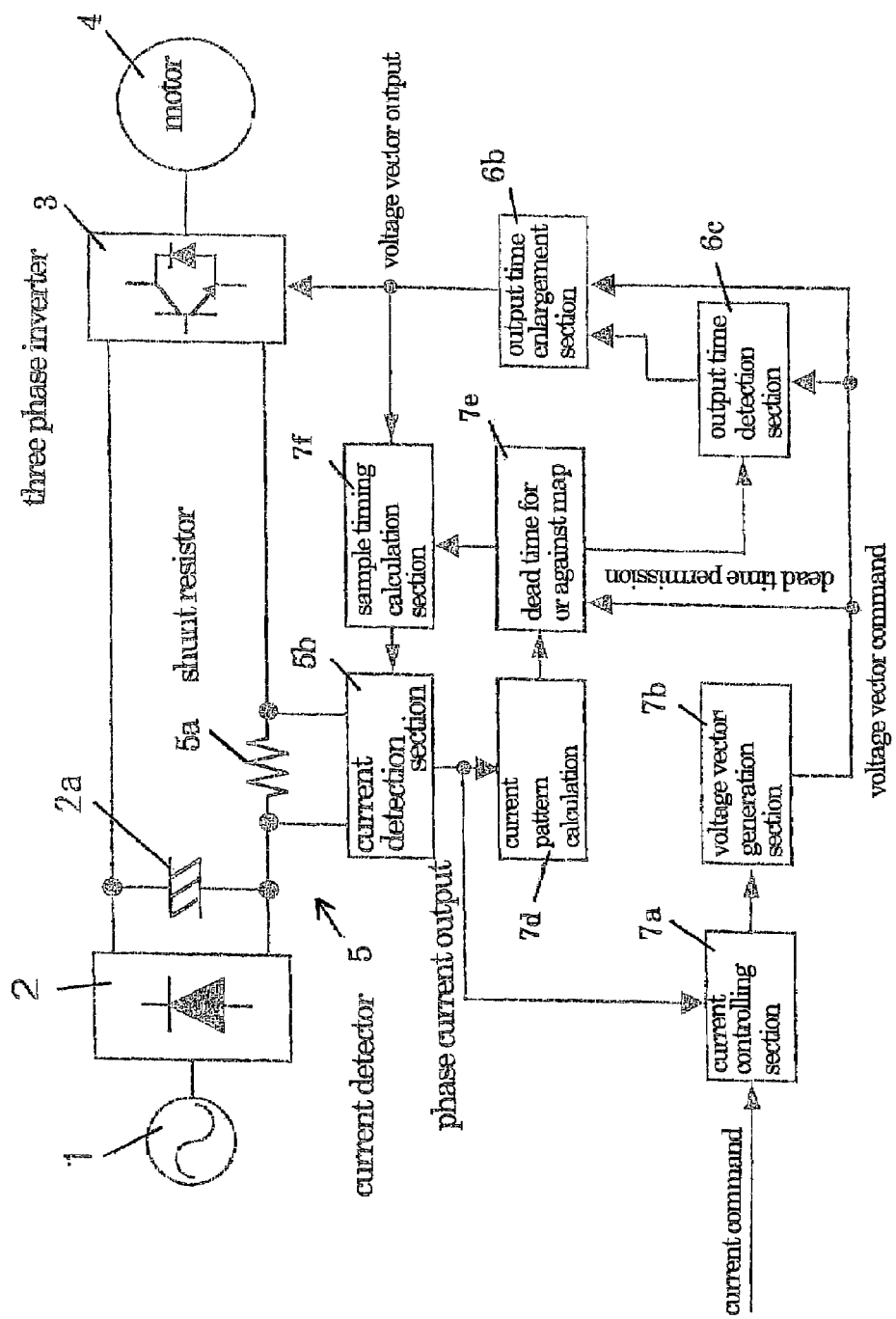
FIG. 12 is a block diagram illustrating a phase current detection apparatus of a further embodiment according to the present invention.

FIG. 12 is a block diagram illustrating a phase current detection apparatus of a further embodiment according to the present invention.

This phase current detection apparatus is different from the phase current detection apparatus of FIG. 9 in that a current pattern calculation section 7d, dead time for and against map 7e, and sample timing calculation section 7f are further provided, and in that a section further having function for receiving a dead time permission signal and for detecting a voltage vector shorter than the minimum vector length by including the dead time in the output time is employed as the output time detection section 6c.

The current pattern calculation section 7d receives the phase current output from the current detector 5 as input, and calculates the direction of the phase current.

The dead time for and against map 7e receives the direction of the phase current and the voltage vector command as input, determines whether or not the current detection is possible within the dead time, and outputs a dead time allowance signal when the current detection is possible.

The sample timing calculation section 7f outputs a current detection timing signal at a predetermined timing within the vector output period including the dead time from the voltage vector output and the output signal from the dead time for and against map 7e, and supplies the current detection timing signal to the current detector 5.

Figure 13:
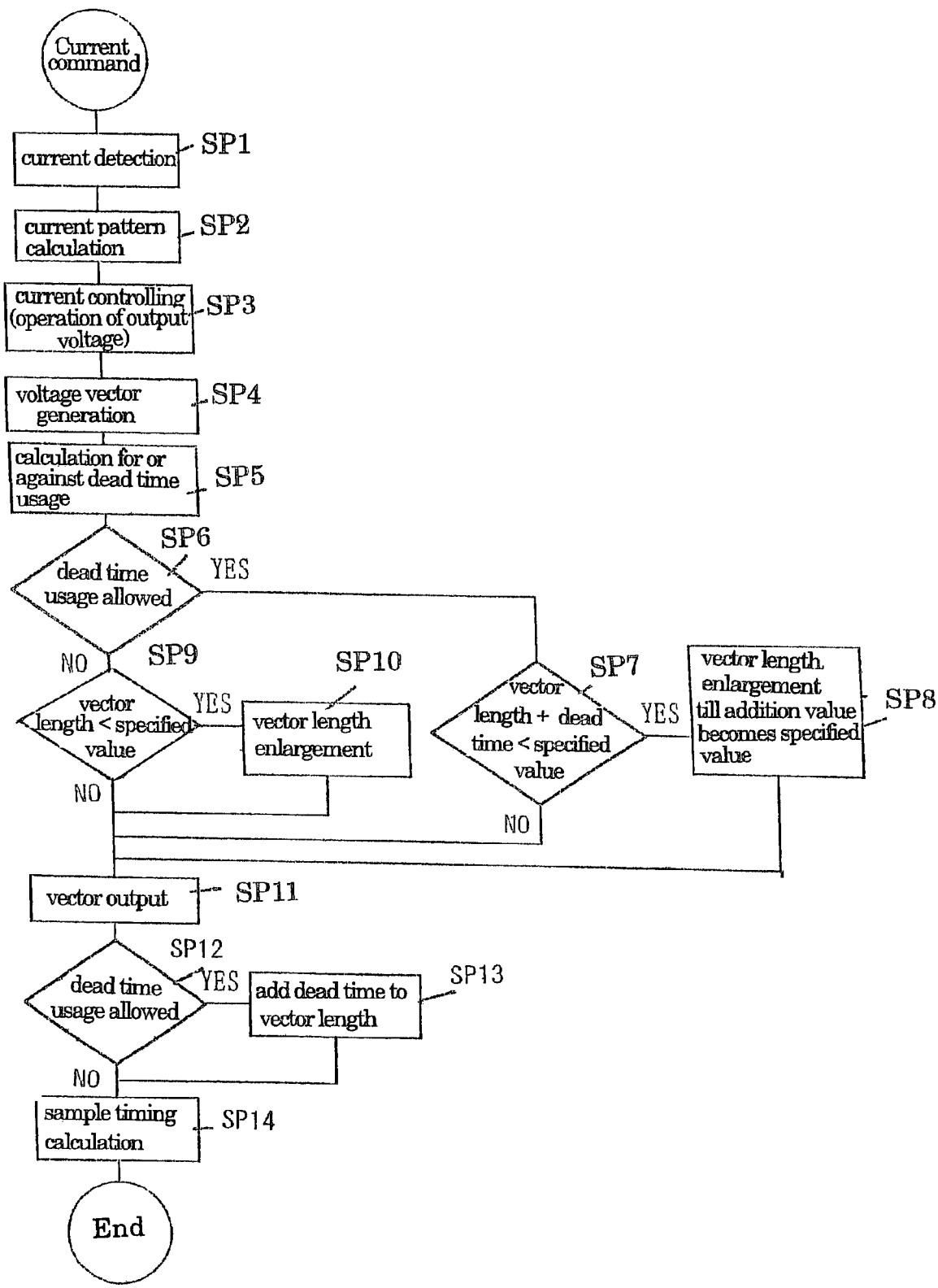
FIG. 13 is a flowchart useful in understanding a phase current detection method of a further embodiment according to the present invention.

FIG. 13 is a flowchart useful in understanding a phase current detection method of a further embodiment according to the present invention.

When the current command is given, in step SP1, a DC link current is detected by the current detector 5. In step SP2, a current pattern is calculated from the detected DC link current (phase current). In step SP3, a voltage command is obtained by carrying out the current controlling operation. In step SP4, a voltage vector is generated based upon the voltage command. In step SP5, it is judged whether or not current detection is possible within the dead time. In step SP6, it is judged whether or not the dead time is available.

When it is judged in step SP6 that the dead time is available, in step SP7, it is judged whether or not sum of the voltage vector length and the dead time is less than a predetermined specified value.

When it is judged in step SP7 that the sum of the voltage vector length and the dead time is less than the predetermined specified value, in step SP8, a voltage vector length is enlarged till the sum value becomes the specified value.

When it is judged in step SP6 that the dead time is not available, in step SP9, it is judged whether or not a voltage vector length is less than a predetermined specified value.

When it is judged in step 9 that the voltage vector length is less than the predetermined specified value, in step SP10, the voltage vector length is enlarged.

When it is judged in step SP7 that the sum value is equal to or greater than the specified value, when it is judged in step SP9 that the voltage vector length is equal to or greater than the specified value, when the processing of step SP8 is carried out, or when the processing of step SP10 is carried out, in step SP11, the voltage vector is output. In step SP12, it is judged whether or not the dead time is available.

When it is judged in step SP12 that the dead time is available, in step SP13, the dead time is added to the voltage vector length.

When it is judged in step SP12 that the dead time is not available, or when the processing of step SP13 is carried out, in step SP14, a sample timing is calculated. Then, the series of processing is finished.

Then, the operation and effect of the above phase current detection apparatus and method are described.

Figure 14:
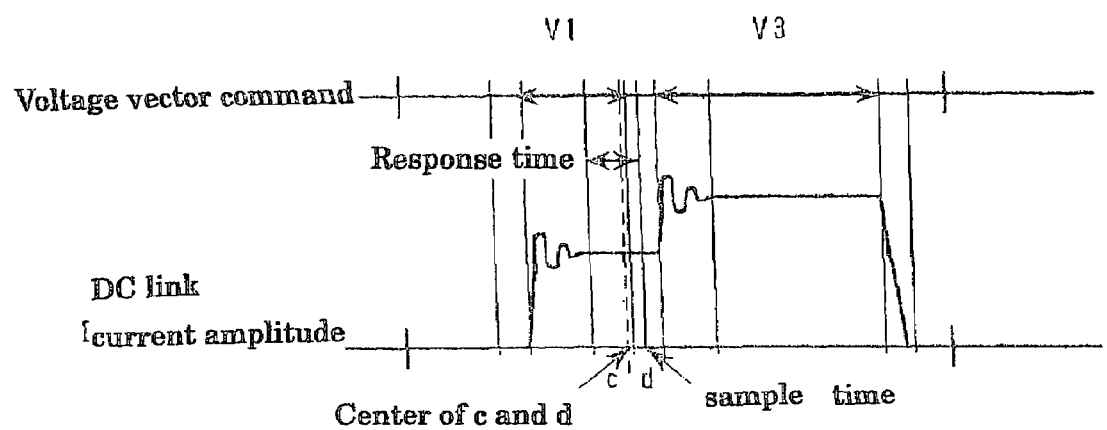
FIG. 14 is a diagram illustrating an actual current waveform of an example which flows in the DC link.

The current schematically illustrated in FIG. 4 includes a dead time (a condition in which both switching devices of upper arm and lower arm are turned OFF) in actual, as is illustrated in FIG. 14.

The current flowing the DC link during the dead time is determined based upon the direction of the phase current and the applied voltage vector. Therefore, the dead time period in addition to the application period of the voltage vector becomes the period which allows the current measurement when the current to be measured corresponding to the applied voltage vector is equal to the current flowing within the dead time. That is, the current measurement can also be measured within the dead time period when the reflux diode which turns ON within the dead time period determined based upon the direction of the current and the transistor which turns ON corresponding to the applied voltage vector are the same. An example of this relationship is illustrated in Table 2.

TABLE 2

| Switch condition | | | Current direction | | | Terminal voltage condition | | | Voltage vector | Current direction | DC linkcurrent |
| --- | --- | --- | --- | --- | --- | --- | --- | --- | --- | --- | --- |
| U | V | W | U | V | W | U | V | W | | | |
| 0 | 0 | 0 | 0 | 0 | 1 | 0 | 0 | 0 | 0 | 1 | 0 x |
|   |   |   | 0 | 1 | 0 | 0 | 0 | 0 | 0 | 2 | 0 x |
|   |   |   | 0 | 1 | 1 | 0 | 0 | 0 | 0 | 3 | 0 x |
|   |   |   | 1 | 0 | 0 | 0 | 0 | 0 | 0 | 4 | 0 x |
|   |   |   | 1 | 0 | 1 | 0 | 0 | 0 | 0 | 5 | 0 x |
|   |   |   | 1 | 1 | 0 | 0 | 0 | 0 | 0 | 6 | 0 x |
| 0 | 0 | 1 | 0 | 0 | 1 | 0 | 0 | 1 | 1 | 1 | lw + |
|   |   |   | 0 | 1 | 0 | 0 | 0 | 1 | 1 | 2 | lw − |
|   |   |   | 0 | 1 | 1 | 0 | 0 | 1 | 1 | 3 | lw + |
|   |   |   | 1 | 0 | 0 | 0 | 0 | 1 | 1 | 4 | lw − |
|   |   |   | 1 | 0 | 1 | 0 | 0 | 1 | 1 | 5 | lw + |
|   |   |   | 1 | 1 | 0 | 0 | 0 | 1 | 1 | 6 | lw − |
| 0 | 1 | 0 | 0 | 0 | 1 | 0 | 1 | 0 | 2 | 1 | lv − |
|   |   |   | 0 | 1 | 0 | 0 | 1 | 0 | 2 | 2 | lv + |
|   |   |   | 0 | 1 | 1 | 0 | 1 | 0 | 2 | 3 | lv + |
|   |   |   | 1 | 0 | 0 | 0 | 1 | 0 | 2 | 4 | lv − |
|   |   |   | 1 | 0 | 1 | 0 | 1 | 0 | 2 | 5 | lv − |
|   |   |   | 1 | 1 | 0 | 0 | 1 | 0 | 2 | 6 | lv + |
| 0 | 1 | 1 | 0 | 0 | 1 | 0 | 1 | 1 | 3 | 1 | lu + |
|   |   |   | 0 | 1 | 0 | 0 | 1 | 1 | 3 | 2 | lu + |
|   |   |   | 0 | 1 | 1 | 0 | 1 | 1 | 3 | 3 | lu + |
|   |   |   | 1 | 0 | 0 | 0 | 1 | 1 | 3 | 4 | lu − |
|   |   |   | 1 | 0 | 1 | 0 | 1 | 1 | 3 | 5 | lu − |
|   |   |   | 1 | 1 | 0 | 0 | 1 | 1 | 3 | 6 | lu − |
| 1 | 0 | 0 | 0 | 0 | 1 | 1 | 0 | 0 | 4 | 1 | lu − |
|   |   |   | 0 | 1 | 0 | 1 | 0 | 0 | 4 | 2 | lu − |
|   |   |   | 0 | 1 | 1 | 1 | 0 | 0 | 4 | 3 | lu − |
|   |   |   | 1 | 0 | 0 | 1 | 0 | 0 | 4 | 4 | lu + |
|   |   |   | 1 | 0 | 1 | 1 | 0 | 0 | 4 | 5 | lu + |
|   |   |   | 1 | 1 | 0 | 1 | 0 | 0 | 4 | 6 | lu + |
| 1 | 0 | 1 | 0 | 0 | 1 | 1 | 0 | 1 | 5 | 1 | lv + |
|   |   |   | 0 | 1 | 0 | 1 | 0 | 1 | 5 | 2 | lv − |
|   |   |   | 0 | 1 | 1 | 1 | 0 | 1 | 5 | 3 | lv − |
|   |   |   | 1 | 0 | 0 | 1 | 0 | 1 | 5 | 4 | lv + |
|   |   |   | 1 | 0 | 1 | 1 | 0 | 1 | 5 | 5 | lv + |
|   |   |   | 1 | 1 | 0 | 1 | 0 | 1 | 5 | 6 | lv − |
| 1 | 1 | 0 | 0 | 0 | 1 | 1 | 1 | 0 | 6 | 1 | lw − |
|   |   |   | 0 | 1 | 0 | 1 | 1 | 0 | 6 | 2 | lw + |
|   |   |   | 0 | 1 | 1 | 1 | 1 | 0 | 6 | 3 | lw − |
|   |   |   | 1 | 0 | 0 | 1 | 1 | 0 | 6 | 4 | lw + |
|   |   |   | 1 | 0 | 1 | 1 | 1 | 0 | 6 | 5 | lw − |
|   |   |   | 1 | 1 | 0 | 1 | 1 | 0 | 6 | 6 | lw + |

TABLE 2-continued

| Switch condition | | | Current direction | | | Terminal voltage condition | | | Voltage vector | Current direction | DC linkcurrent | |
|---|---|---|---|---|---|---|---|---|---|---|---|---|
| U | V | W | U | V | W | U | V | W | | | | |
| 1 | 1 | 1 | 0 | 0 | 1 | 1 | 1 | 1 | 7 | 1 | 0 | x |
|   |   |   | 0 | 1 | 0 | 1 | 1 | 1 | 7 | 2 | 0 | x |
|   |   |   | 0 | 1 | 1 | 1 | 1 | 1 | 7 | 3 | 0 | x |
|   |   |   | 1 | 0 | 0 | 1 | 1 | 1 | 7 | 3 | 0 | x |
|   |   |   | 1 | 0 | 1 | 1 | 1 | 1 | 7 | 5 | 0 | x |
|   |   |   | 1 | 1 | 0 | 1 | 1 | 1 | 7 | 6 | 0 | x |
| d | 0 | 0 | 0 | 0 | 1 | 1 | 0 | 0 | 4 | 1 | lu | – |
|   |   |   | 0 | 1 | 0 | 1 | 0 | 0 | 4 | 2 | lu | – |
|   |   |   | 0 | 1 | 1 | 1 | 0 | 0 | 4 | 3 | lu | – |
|   |   |   | 1 | 0 | 0 | 0 | 0 | 0 | 0 | 4 | 0 | x |
|   |   |   | 1 | 0 | 1 | 0 | 0 | 0 | 0 | 5 | 0 | x |
|   |   |   | 1 | 1 | 0 | 0 | 0 | 0 | 0 | 6 | 0 | x |
| d | 0 | 1 | 0 | 0 | 1 | 1 | 0 | 1 | 5 | 1 | lv | + |
|   |   |   | 0 | 1 | 0 | 1 | 0 | 1 | 5 | 2 | lv | – |
|   |   |   | 0 | 1 | 1 | 1 | 0 | 1 | 5 | 3 | lv | – |
|   |   |   | 1 | 0 | 0 | 0 | 0 | 1 | 1 | 4 | lw | – |
|   |   |   | 1 | 0 | 1 | 0 | 0 | 1 | 1 | 5 | lw | + |
|   |   |   | 1 | 1 | 0 | 0 | 0 | 1 | 1 | 6 | lw | – |
| d | 1 | 0 | 0 | 0 | 1 | 1 | 1 | 0 | 6 | 1 | lw | – |
|   |   |   | 0 | 1 | 0 | 1 | 1 | 0 | 6 | 2 | lw | + |
|   |   |   | 0 | 1 | 1 | 1 | 1 | 0 | 2 | 3 | lw | – |
|   |   |   | 1 | 0 | 0 | 0 | 1 | 0 | 2 | 4 | lv | – |
|   |   |   | 1 | 0 | 1 | 0 | 1 | 0 | 2 | 5 | lv | – |
|   |   |   | 1 | 1 | 0 | 0 | 1 | 0 | 2 | 6 | lv | + |
| d | 1 | 1 | 0 | 0 | 1 | 1 | 1 | 1 | 7 | 1 | 0 | x |
|   |   |   | 0 | 1 | 0 | 1 | 1 | 1 | 7 | 2 | 0 | x |
|   |   |   | 0 | 1 | 1 | 1 | 1 | 1 | 7 | 3 | 0 | x |
|   |   |   | 1 | 0 | 0 | 0 | 1 | 1 | 3 | 4 | lu | – |
|   |   |   | 1 | 0 | 1 | 0 | 1 | 1 | 3 | 5 | lu | – |
|   |   |   | 1 | 1 | 0 | 0 | 1 | 1 | 3 | 6 | lu | – |
| 0 | d | 0 | 0 | 0 | 1 | 0 | 1 | 0 | 2 | 1 | lv | – |
|   |   |   | 0 | 1 | 0 | 0 | 0 | 0 | 0 | 2 | 0 | x |
|   |   |   | 0 | 1 | 1 | 0 | 0 | 0 | 0 | 3 | 0 | x |
|   |   |   | 1 | 0 | 0 | 0 | 1 | 0 | 2 | 4 | lv | – |
|   |   |   | 1 | 0 | 1 | 0 | 1 | 0 | 2 | 5 | lv | – |
|   |   |   | 1 | 1 | 0 | 0 | 0 | 0 | 0 | 6 | 0 | – |

In Table 2, ON in Table 1 is represented with "1", and timing within the dead time period is represented with d, for conditions of SW and for conditions of terminal voltage. Flowing into the motor is represented with "1" for a direction of the current. The DC link current represents the current appeared in the DC link at this timing and the polarity thereof. A pattern can be obtained from this which pattern corresponds allowance of current measurement even when the timing is within the dead time period. Other patterns are also obtained.

Therefore, the phase current was conventionally detected only within a period excluded the dead time uniformly. But, the phase current can be detected even within the dead time period when this embodiment is employed.

In this embodiment, it is judged whether or not the phase current can be detected within the dead time period using the dead time for and against map. But, it is possible to judge whether or not the phase current can be detected within the dead time period based upon the range of the difference between the voltage phase and current phase.

In each of the above embodiments it is preferable that the center of the period wherein the current corresponding to the voltage vector is observed through the shunt resistor is employed as the current sampling timing.

Description is made further.

Figure 15:
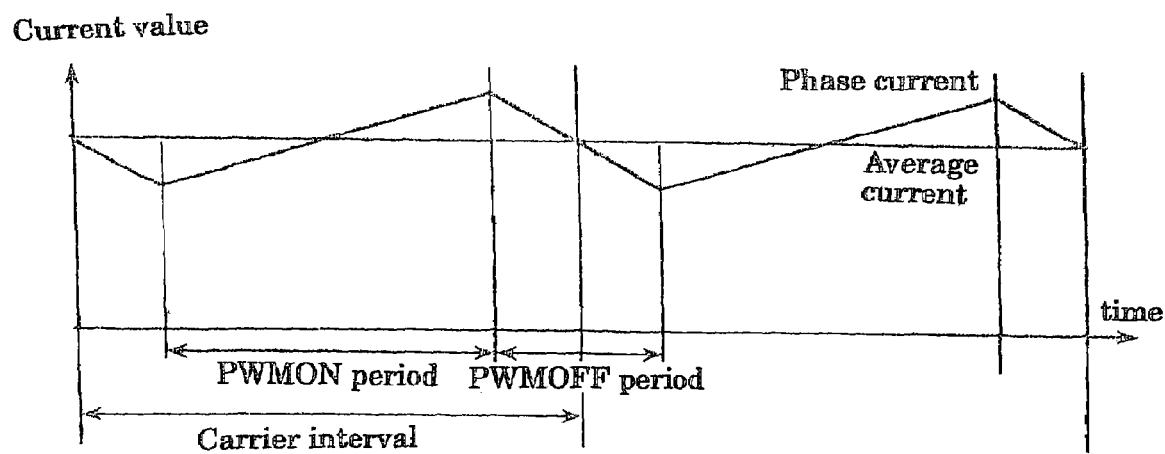
FIG. 15 is a diagram illustrating an instantaneous change of a phase current and average current, both being of an example.

A relationship of an example between the instantaneous waveform of the phase current and average current is illustrated in FIG. 15. The illustration is made as single phase for simplicity in description.

It is preferable that the average current is measured as the phase current. But, a great error is generated at turning ON timing of PWM and at turning OFF timing of PWM because higher harmonics due to PWM is included in the instantaneous current. As is described earlier, the phase current may flow in the DC link within the dead time period. In this case, there exists the difference between the current flowing through the switching device and the current flowing through the reflux diode, but the connection relationship between the DC link and each phase of the motor is the same to that for voltage vector output. Therefore, it is sufficient that this is considered to be included within the turning ON time of PWM.

When those are taken into consideration, higher harmonics error is reduced by employing the center of the period during which the current corresponding to the voltage vector is observed through the shunt resistor as the timing which is within the period the phase current flows the DC link among the period for turning ON of PWM and the dead time period, and at which the nearly average current and DC link current are coincident to one another.

The dead time is well smaller in comparison with the turning ON time of PWM in usual, and the appearance time itself of the voltage vector is short when the turning ON time of PWM is shorter with respect to the dead time, therefore the current higher harmonics becomes smaller so that error is difficult to be generated. As a result, the current detection can be carried out at the center of the turning ON time of PWM excepting the dead time so that the controlling can be simplified.

There exist a case in which the current detection is possible and a case in which the current detection is impossible in the dead time periods. When the actual current detection is taken into consideration, there exists a period in which current cannot be measured within the transient period from the change in current value till the circuit becoming stable. Therefore, it is necessary that the measurement of current is made accurately by avoiding the transient condition and that the measurement of current is made without unnecessary pulse restriction.

When taking this into consideration, it is preferable that the current is sampled at the center of the period which is excluded the period from the beginning of the period during when the current corresponding to the voltage vector is observed through the shunt resistor till the hardware becoming stable.

Figure 16:
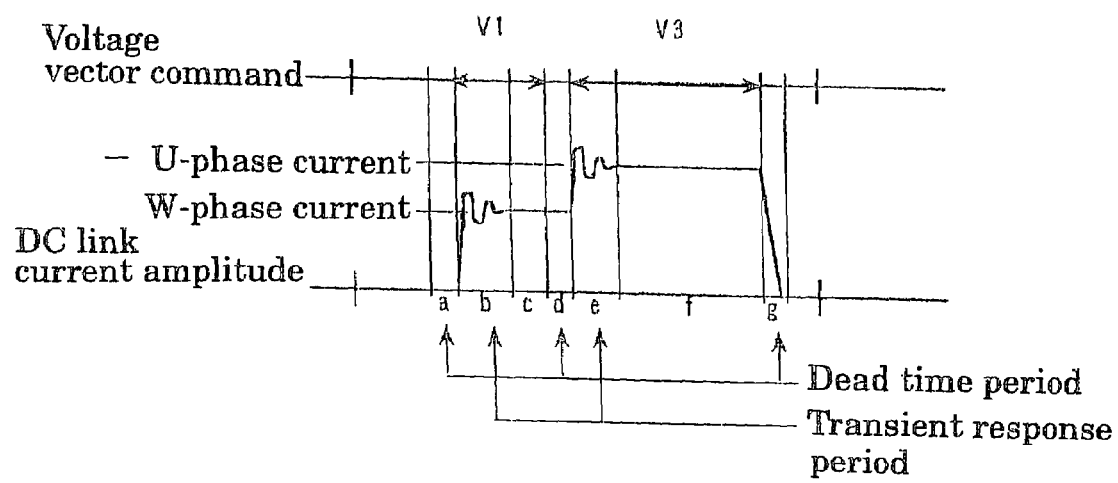
FIG. 16 is a diagram explaining an actual current waveform flowing in the DC link, dead time interval and transient response interval, all being of an example.

FIG. 16 illustrates an actual current waveform of an example.

In this case, it is sufficient that the current detection is carried out within the period c, f excluding the dead time and transient response period. It is preferable that the dead time period d allowing the current detection is also included in the detection period, and that the current is detected at the center of the periods c, d when the voltage vector V1 is output, while the current is detected at the center of the period f when the voltage vector V3 is output, for example.

When the sampling at the center, described above, is impossible due to the restriction by the response time such as delay, settling time of circuit, it is preferable that sampling is carried out at a timing later than the timing the response time has passed from the beginning of the period so that the phase current can be detected with accuracy.

Figure 17:
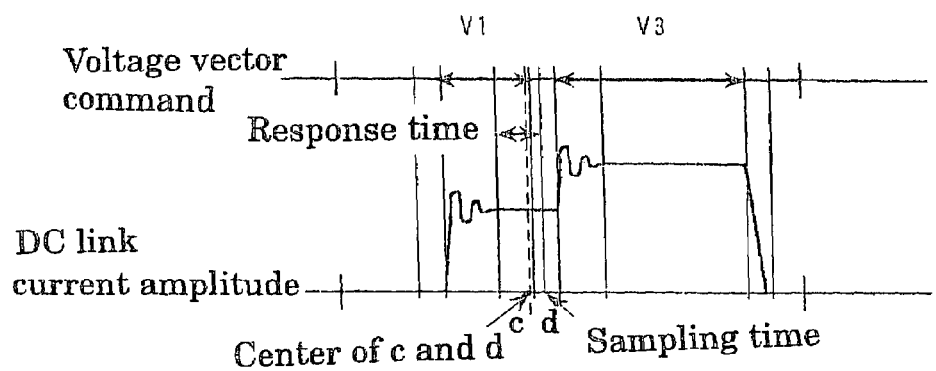
FIG. 17 is a diagram explaining an actual current waveform flowing in the DC link, response time and sampling time, all being of an example.

Specifically, when the current waveform flowing the DC link is given as illustrated in FIG. 17, for example, sampling at the center as is described above is impossible because the response time is longer than half of the period c, d. But, the phase current can be detected with accuracy by carrying out sampling at a timing later than the timing the response time has passed from the beginning of the period c.

Figure 18:
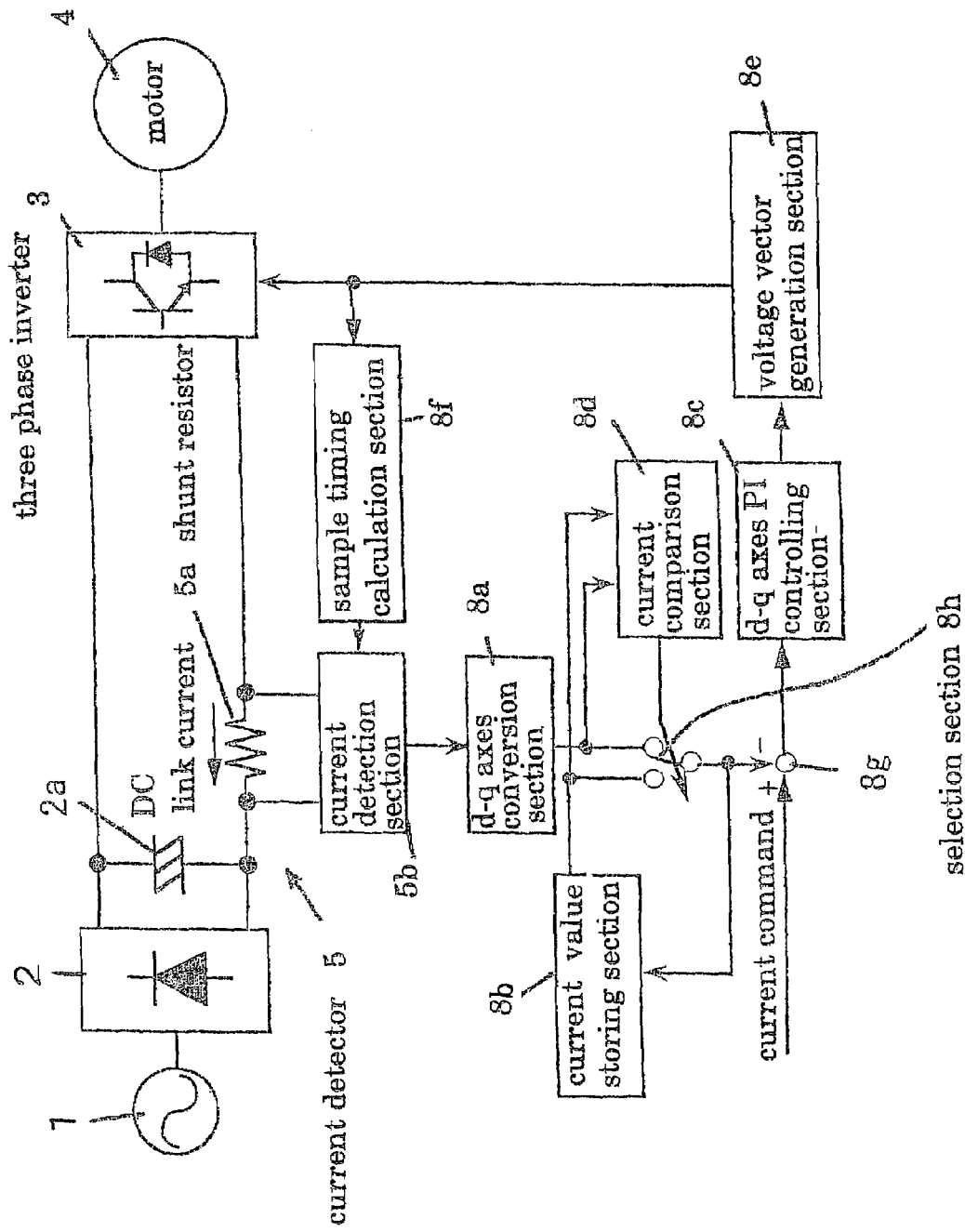
FIG. 18 is a block diagram illustrating a phase current detection apparatus of a further embodiment according to the present invention.

FIG. 18 is a block diagram illustrating a phase current detection apparatus of a further embodiment according to the present invention.

This phase current detection apparatus comprises a d-q axes conversion section 8a, current value storing section 8b, d-q axes PI controlling section 8c, current comparison section 8d, voltage vector generation section 8e, and sample timing calculation section 8f.

The d-q axes conversion section 8a receives the DC link current output from the current detector 5 as input and converts the current into a current on rotating coordinate d-q axes which rotates to suit the rotor following the rotating position of the rotor calculated separately. Therefore, this output becomes a DC vector when the current smoothly rotates following the rotation of the rotor.

The current value storing section 8b stores the current value for 1 carrier.

The d-q axes PI controlling section 8c calculates an output voltage command by the PI controlling from the current command and current detection value.

The current comparison section 8d judges whether or not the current vector has greatly changed by comparing the current value from the d-q axes conversion section 8a and the current value from the current value storing section 8b.

The voltage vector generation section 8e generates a voltage vector from the calculated output voltage command.

The sample timing calculation section 8f outputs a sample timing properly in response to the voltage vector, and supplies the sample timing to the current detector 5.

The reference of 8h represents a selection section which carries out changeover operation based upon the output signal from the current comparison section 8d, and selects one of the current from the d-q axes conversion section 8a and the current from the current value storing section 8b. The reference of 8g represents a subtraction section which calculates a difference between the current command and the selected current.

Operation and effect of the phase current detection apparatus having the above arrangement are as follows.

When the output voltage vector is short, and when the current cannot be detected with accuracy by the current detector 5, the output from the d-q axes conversion section 8a changes greater in comparison to the previous case. Therefore, it is judged that the current detection has failed when it is judged in the current comparison section 8d that the current vector has changed greater, and the current value from the current value storing section 8b is selected by carrying out the changeover operation of the selection section 8h.

The operation and effect of the subtraction section 8g, d-q axes PI controlling section 8c, and voltage vector generation section 8e are known, therefore the description is omitted.

In the above case, the current detection is not carried out. No great problem is generated because the voltage vector length becomes short only for a case that two phase voltages become nearly the same to one another when the motor is usually driven, and because the voltage vector length becomes longer following the rotation of the motor.

In this embodiment, the failure of the current detection is detected, and the current value (current estimation value) from the current value storing section 8b is selected, but the voltage vector output period being equal to or less than a predetermined threshold value may be detected, and the current value from the current value storing section 8b may be selected.

Instead of providing the current value storing section 8b, it is possible that the integration item of the d-q axes PI controlling section 8c is employed so that the arrangement can be simplified.

In the above embodiment, the current value from the current detection section 5b is employed as it is as the current value. It is possible that a current value at a desired timing is estimated by correcting the shifting in current due to the shifting between the timing for carrying out the d-q conversion and the sample timing for current detection to suit the pulse output which ample timing is instructed by the sample timing calculation section 8f, using a current estimation value generated from the current detection values in the past. It is also preferable that the current measurement value from the current detection section 5b is reflected to the controlling for each sampling timing so as to make the controlling faster.

Figure 19:
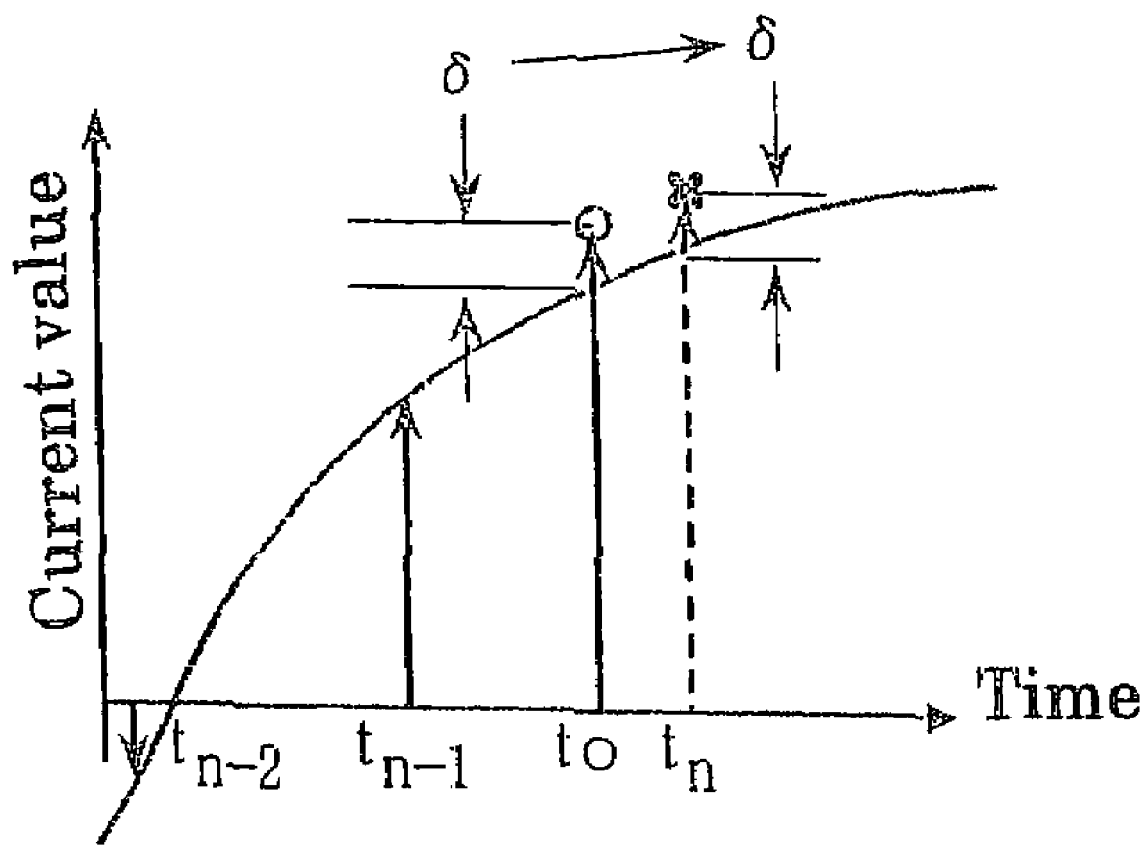
FIG. 19 is a diagram useful in understanding an estimation method of a current value of an example.

Description is made further with reference to FIG. 19.

In FIG. 19, tn−2, and tn−1 are prior current obtainment values, and t0 is a current detection timing, and tn is a desired current obtainment timing.

When a current value to be obtained is supposed to be a phase current, the current value changes in nearly sine wave shape following the rotation of the rotor. Therefore, when the current detection timing is different from the current obtaining timing, and when the operation is carried out as it is, an error is generated due to the current change following the rotation.

But, a current value with little error is obtained even when the current detection time is different from the current obtaining timing, by calculating the current estimation values at t0 and tn from the obtained current values prior to tn−1, and by adding a difference between the actual measurement value at t0 and the estimation value at t0 to the current estimation value at tn, and by determining the addition result as the detection current value at tn.

Figure 20:
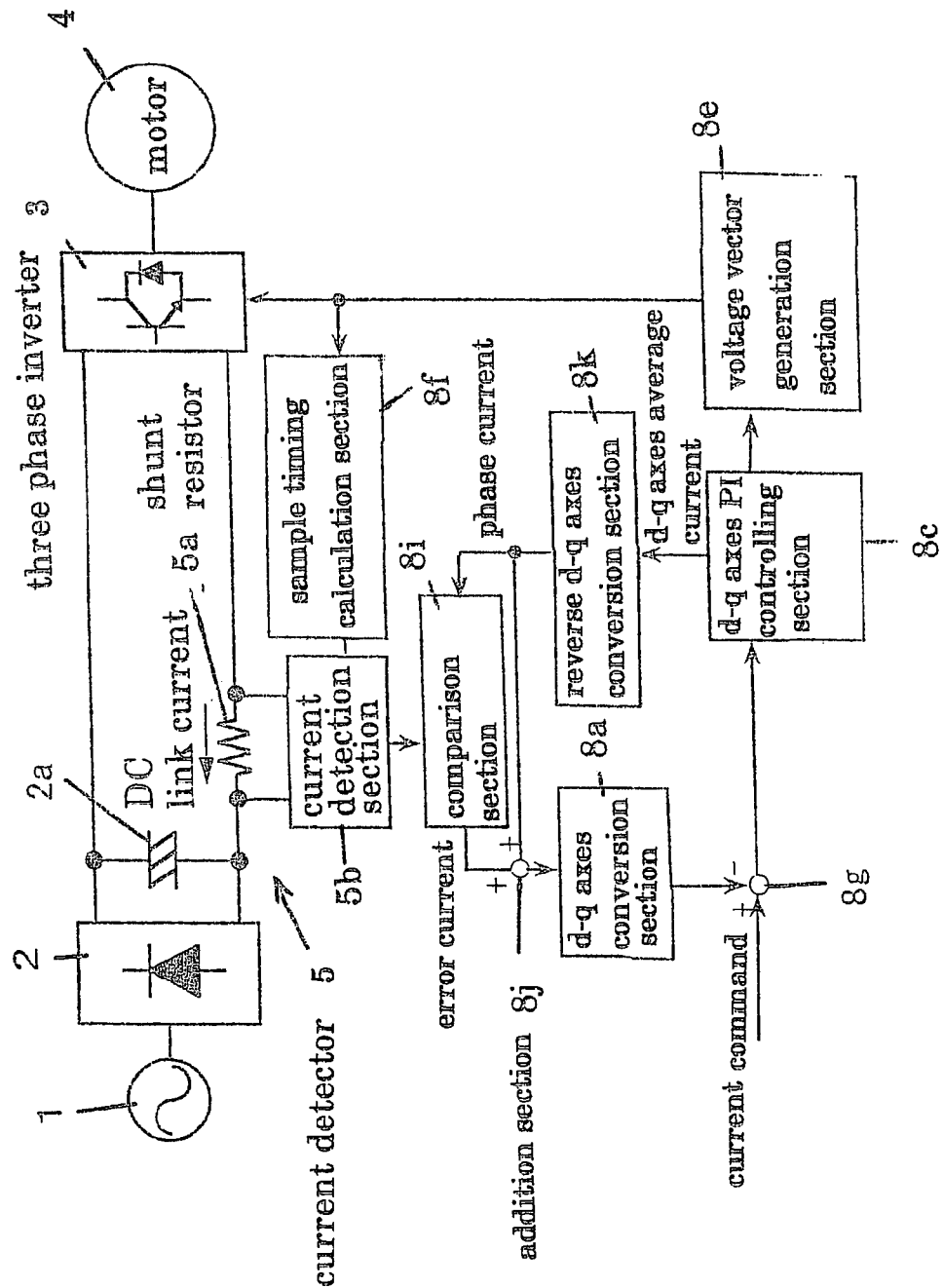
FIG. 20 is a block diagram illustrating a phase current detection apparatus of a further embodiment according to the present invention.

FIG. 20 is a block diagram illustrating a phase current detection apparatus for carrying out the above correction.

This phase current detection apparatus is different from the phase current detection apparatus of FIG. 18 in that a comparison section 8i and addition section 8j are provided between the current detector 5 and d-q axes conversion section 8a, in that a reverse d-q axes conversion section 8k is provided, and in that the current comparison section 8d and selection section 8h are omitted.

The reverse d-q axes conversion section 8k receives the d-q axes average current output from the d-q axes PI controlling section 8c as input, and converts the d-q axes average current into the phase current following the rotation position of the rotor calculated separately.

The comparison section 8i compares the phase current and the corresponding current value detected by the current detector 5, and calculates an error current (at t0 in FIG. 19).

Therefore, the timing for obtaining current (tn in FIG. 19) has reached, the phase current from the reverse d-q axes conversion section 8k and the error cur rent from the comparison section 8i are added, and the addition result is supplied to the d-q axes conversion section 8a as the current detection value.

As a result, a desired voltage vector can be generated using the current value corrected by the addition of the error current.

Further, it is possible that the estimation current is corrected by operating an amplitude error from the error current, and by adding the amplitude error to the estimation current at a desired timing.

Figure 21:
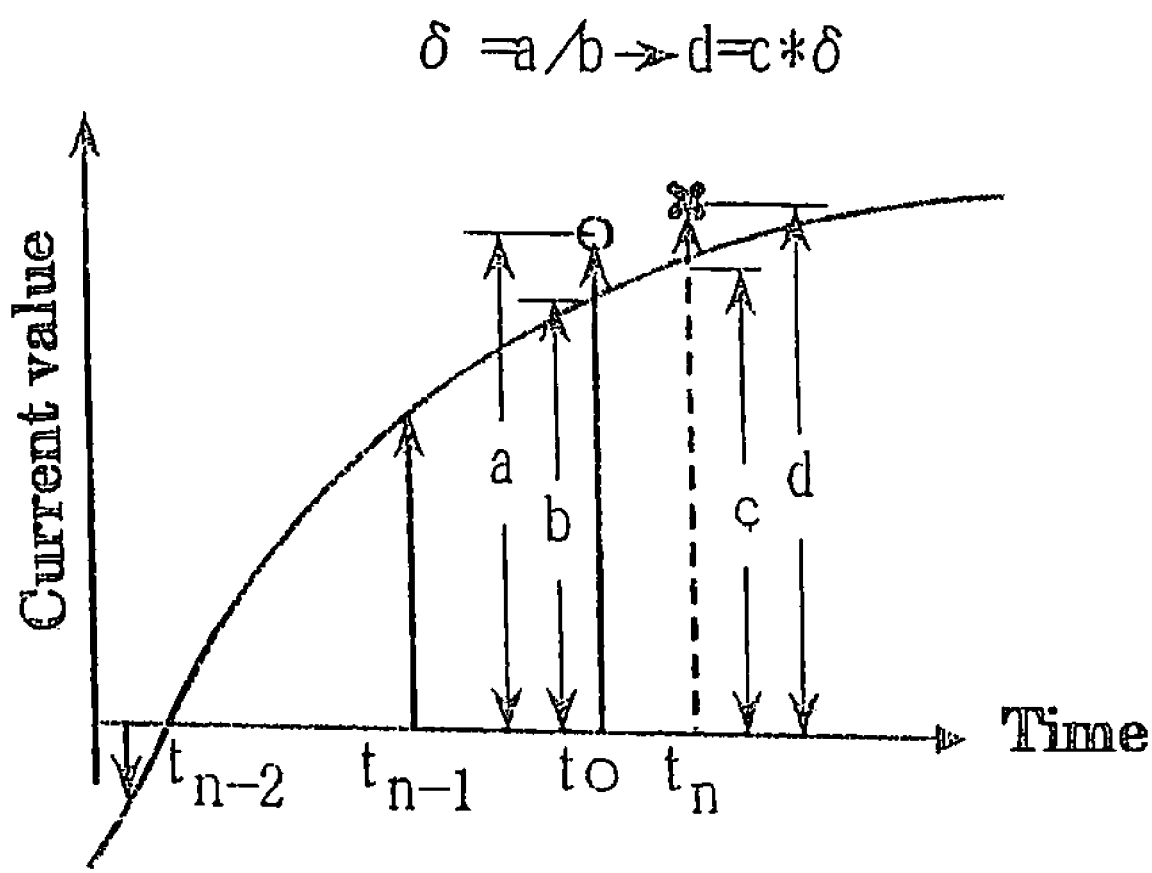
FIG. 21 is a diagram useful in understanding an estimation method of a current value of another example.

Description is made further with reference to FIG. 21.

The current estimation values (b and c) at t0 and tn are calculated from the detected current values prior to tn−2, and tn−1, the ratio of the actual measurement value (a) at t0 and the estimation value (b) at t0 is multiplies to the current estimation value (c) at tn, and the multiplication result is determined to be the detected current value (d) at tn. Therefore, the current value with little error is obtained even when the current detection time is different from the current obtaining timing.

When this correction is to be carried out, it is sufficient that a division section 8m is employed instead the comparison section 8i, and that a multiplication section 8n is employed instead the addition section 8j.

When the error in amplitude is calculated as a ratio, the estimation with high accuracy is realized when the current value is great, but when the current value is small, affection of noise appears greatly so that the estimated current is greatly different from the actual current.

Therefore, good current estimation is always realized by properly changing over the estimation method corresponding to FIG. 19 and the estimation method corresponding to FIG. 21 depending upon the current value.

Figure 22:
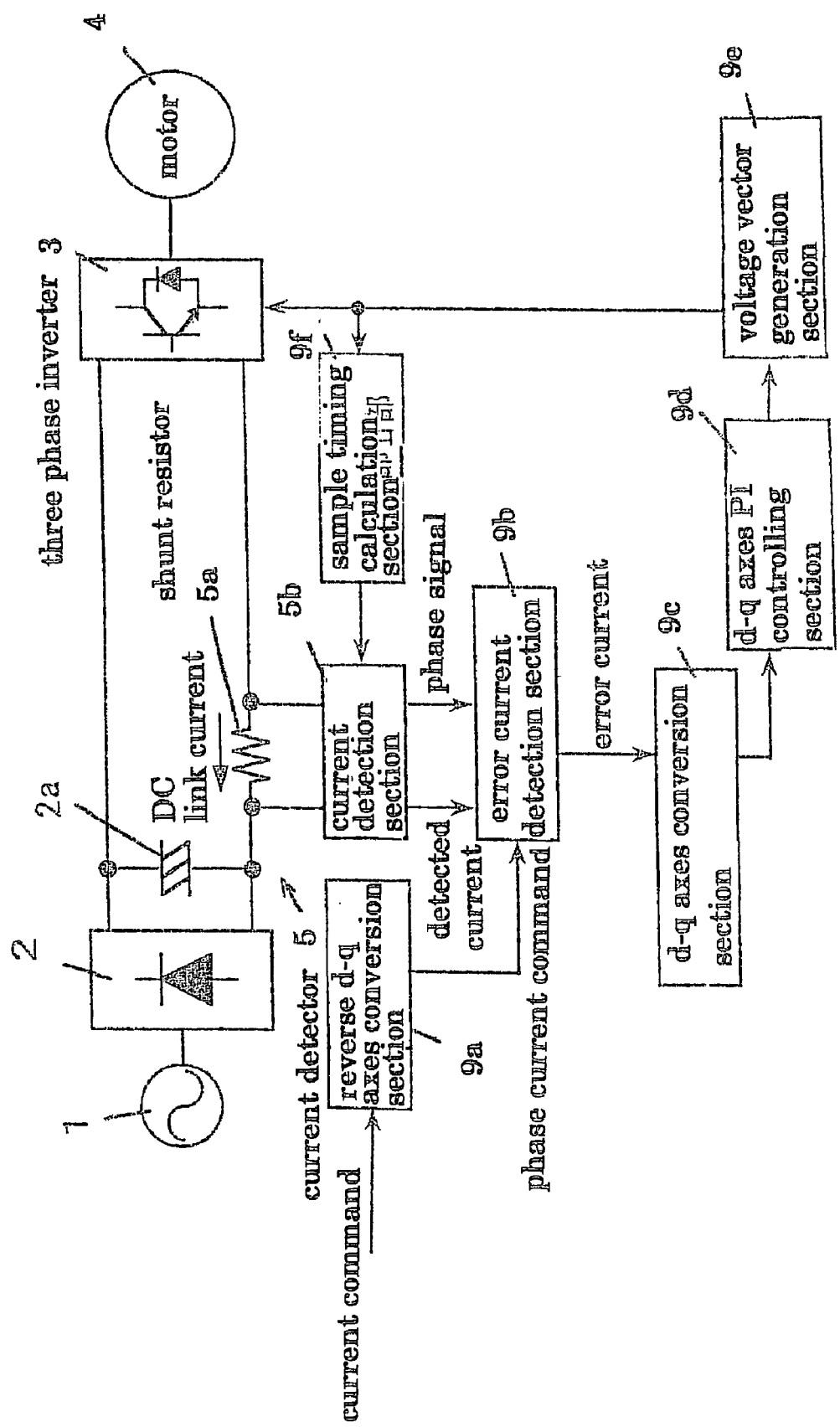
FIG. 22 is a diagram illustrating an inverter controlling apparatus of an embodiment according to the present invention.

FIG. 22 is a block diagram illustrating an inverter controlling apparatus of an embodiment according to the present invention.

This inverter controlling apparatus comprises a reverse d-q axes conversion section 9a, error current detection section 9b, d-q axes conversion section 9c, d-q axes PI controlling section 9d, voltage vector generation section 9e, and sample timing calculation section 9f.

The reverse d-q axes conversion section 9a converts the current command onto a phase current command using a rotor angle calculated separately.

The current detector 5 for detecting the DC link current outputs not only the detected current but also a phase signal representing which phase is the current.

The error current detection section 9b compares only the detected phase, and determines the other phase to be 0 which is output as the error current.

The d-q axes conversion section 9c converts the error current into the d-q axes current.

When the inverter controlling apparatus is employed, the current controlling following the current command is realized by outputting the error current between the phase current command and the detected current value by the error current detection section 9b, and by supplying the error current to the d-q axes conversion section 9c, d-q axes PI controlling section 9d, voltage vector generation section 9e sequentially.

In this case, accumulation of error is small because unnecessary estimation is not carried out. The controlling speed of the current controlling loop can be raised because the calculation for next voltage vector can be started just after the detection.

The operation and effect are similar to those of a case in which the inverter controlling apparatus is applied to sensorless controlling of a motor.

Figure 23:
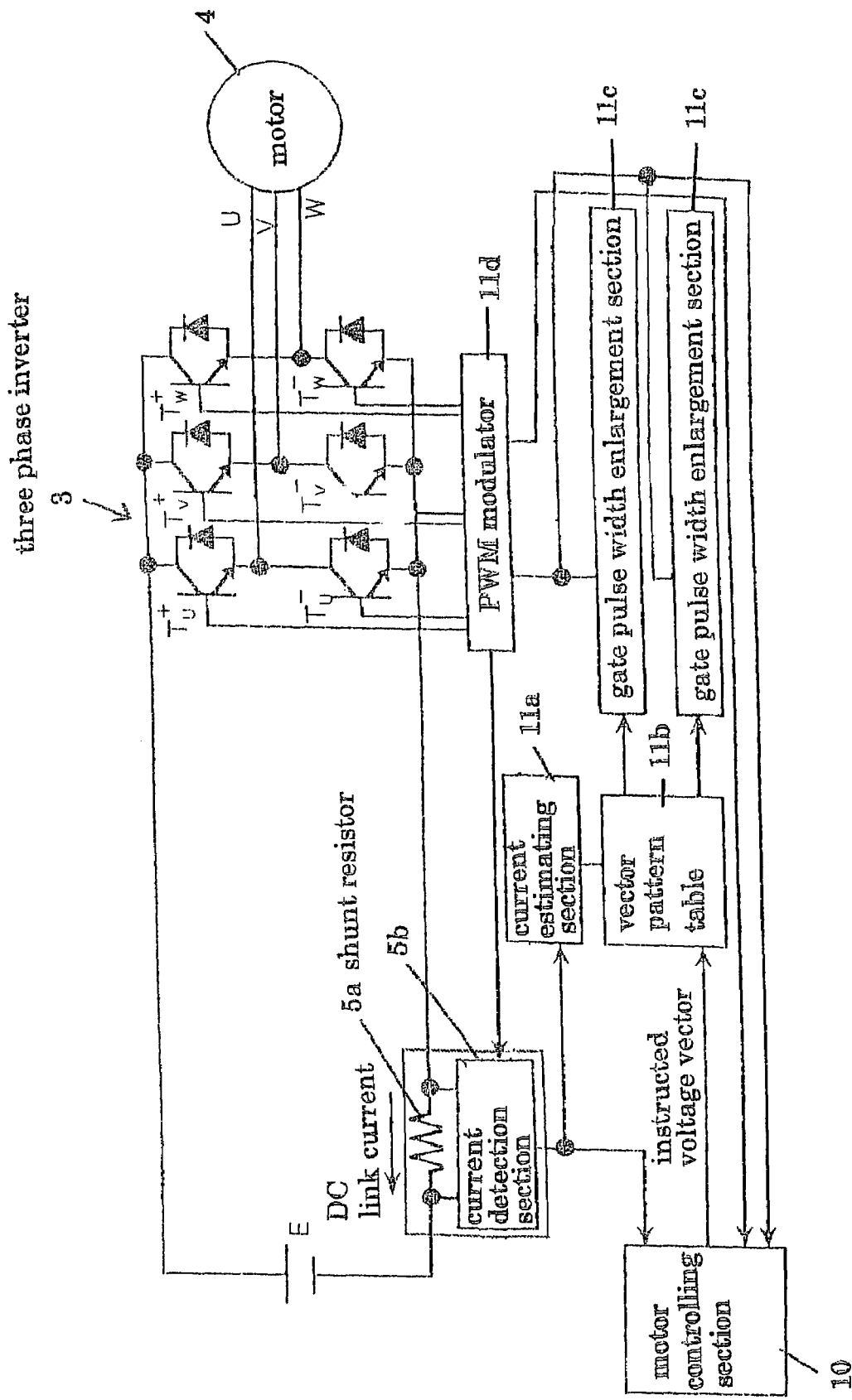
FIG. 23 is a block diagram illustrating a phase current detection apparatus of a further embodiment according to the present invention.

FIG. 23 is a block diagram illustrating a phase current detection apparatus of a further embodiment according to the present invention.

The current detection section 5b receives the voltage between terminals of the shunt resistor 5a as input and measures the DC link current, and supplies the measurement result to the motor controlling section 10 and current estimation section 11a. The current estimation section 11a estimates the direction of the current at next current detection timing by approximately using the direction of the current or the like for just prior operation, and supplies the estimation result to the vector pattern table 11b. The vector pattern table 11b outputs the vector to be output, and its length, and the condition of the switch at the voltage changing timing based upon the direction of the current and the instructed voltage vector (pattern and length) from the motor controlling section 10. The gate pulse width enlargement section 11c calculates a required gate pulse width required for current detection from Table 3 based upon the output from the vector pattern table 11b, enlarges the gate pulse width up to the required gate pulse width when the gate pulse width is short, and supplies the required gate pulse to the PWM modulator 11d.

TABLE 3

| Switch operation prior and after vector output | | Gate pulse width for assuring Ts | Current detection timing |
|---|---|---|---|
| ON | ON | Ts + MAX(Ton) − MIN(Tdon) | Ts + MAX(Ton) |
| ON | OFF | Ts + MAX(Ton) − MIN(Tdoff) | Ts + MAX(Ton) |
| OFF | ON | Ts + MAX(Toff) − MIN(Tdon) | Ts + MAX(Toff) |
| OFF | OFF | Ts + MAX(Toff) − MIN(Tdoff) | Ts + MAX(Toff) |

Now, the current detection timing is output simultaneously. When the detection timing has reached in the PWM modulator 11d, the timing is sent to the current detection section 5b.

Further, the contents of the vector pattern table 11b are represented in Table 4, for example.

TABLE 4

| current direction | changing direction | triangle wave rising: → | | | | | | triangle wave falling: ← | | | | | | |
|---|---|---|---|---|---|---|---|---|---|---|---|---|---|---|
| | | voltage vector | | | | | | DC link current | | | | | | |
| | | v | d | v | d | v | d | v | v | d | v | d | v | d | v |
| 1 | | 0 | 4 | 4 | 6 | 6 | 6 | 7 | 0 | Iu | Iu | Iw | Iw | Iw | 0 |
| 5 | | 0 | 0 | 4 | 6 | 6 | 6 | 7 | 0 | 0 | Iu | Iw | Iw | Iw | 0 |
| 4 | | 0 | 0 | 4 | 6 | 6 | 7 | 7 | 0 | 0 | Iu | Iw | Iw | 0 | 0 |
| 6 | | 0 | 0 | 4 | 4 | 6 | 7 | 7 | 0 | 0 | Iu | Iu | Iw | 0 | 0 |
| 2 | | 0 | 4 | 4 | 4 | 6 | 7 | 7 | 0 | Iu | Iu | Iu | Iw | 0 | 0 |
| 3 | | 0 | 4 | 4 | 4 | 6 | 6 | 7 | 0 | Iu | Iu | Iu | Iw | Iw | 0 |

TABLE 4-continued

| current direction | changing direction | triangle wave rising: → voltage vector | | | | | | | triangle wave falling: ← DC link current | | | | | | |
|---|---|---|---|---|---|---|---|---|---|---|---|---|---|---|---|
| | | v | d | v | d | v | d | v | v | d | v | d | v | d | v |
| 1 | | 0 | 2 | 2 | 6 | 6 | 6 | 7 | 0 | Iv | Iv | Iw | Iw | Iw | 0 |
| 5 | | 0 | 2 | 2 | 2 | 6 | 6 | 7 | 0 | Iv | Iv | Iv | Iw | Iw | 0 |
| 4 | | 0 | 2 | 2 | 2 | 6 | 7 | 7 | 0 | Iv | Iv | Iv | Iw | 0 | 0 |
| 6 | | 0 | 0 | 2 | 2 | 6 | 7 | 7 | 0 | 0 | Iv | Iv | Iw | 0 | 0 |
| 2 | | 0 | 0 | 2 | 6 | 6 | 7 | 7 | 0 | 0 | Iv | Iw | Iw | 0 | 0 |
| 3 | | 0 | 0 | 2 | 6 | 6 | 6 | 7 | 0 | 0 | Iv | Iw | Iw | iw | 0 |
| 1 | | 0 | 2 | 2 | 2 | 3 | 7 | 7 | 0 | Iv | Iv | Iv | Iu | 0 | 0 |
| 5 | | 0 | 2 | 2 | 2 | 3 | 3 | 7 | 0 | Iv | Iv | Iv | Iu | Iu | 0 |
| 4 | | 0 | 2 | 2 | 3 | 3 | 3 | 7 | 0 | Iv | Iv | Iu | Iu | Iu | 0 |
| 6 | | 0 | 0 | 2 | 3 | 3 | 3 | 7 | 0 | 0 | Iv | Iu | Iu | Iu | 0 |
| 2 | | 0 | 0 | 2 | 3 | 3 | 7 | 7 | 0 | 0 | Iv | Iu | Iu | 0 | 0 |
| 3 | | 0 | 0 | 2 | 2 | 3 | 7 | 7 | 0 | 0 | Iv | Iv | Iu | 0 | 0 |
| 1 | | 0 | 0 | 1 | 3 | 3 | 7 | 7 | 0 | 0 | Iw | Iu | Iu | 0 | 0 |
| 5 | | 0 | 0 | 1 | 3 | 3 | 3 | 7 | 0 | 0 | Iw | Iu | Iu | Iu | 0 |
| 4 | | 0 | 1 | 1 | 3 | 3 | 3 | 7 | 0 | Iw | Iw | Iu | Iu | Iu | 0 |
| 6 | | 0 | 1 | 1 | 1 | 3 | 3 | 7 | 0 | Iw | Iw | Iw | Iu | Iu | 0 |
| 2 | | 0 | 1 | 1 | 1 | 3 | 7 | 7 | 0 | Iw | Iw | Iw | Iu | 0 | 0 |
| 3 | | 0 | 0 | 1 | 1 | 3 | 7 | 7 | 0 | 0 | Iw | Iw | Iu | 0 | 0 |
| 1 | | 0 | 0 | 1 | 5 | 5 | 7 | 7 | 0 | 0 | Iw | Iv | Iv | 0 | 0 |
| 5 | | 0 | 0 | 1 | 1 | 5 | 7 | 7 | 0 | 0 | Iw | Iw | Iv | 0 | 0 |
| 4 | | 0 | 1 | 1 | 1 | 5 | 7 | 7 | 0 | Iw | Iw | Iw | Iv | 0 | 0 |
| 6 | | 0 | 1 | 1 | 1 | 5 | 5 | 7 | 0 | Iw | Iw | Iw | Iv | Iv | 0 |
| 2 | | 0 | 1 | 1 | 5 | 5 | 5 | 7 | 0 | Iw | Iw | Iv | Iv | Iv | 0 |
| 3 | | 0 | 0 | 1 | 5 | 5 | 5 | 7 | 0 | 0 | Iw | Iv | Iv | Iv | 0 |
| 1 | | 0 | 4 | 4 | 4 | 5 | 7 | 7 | 0 | Iu | Iu | Iu | Iv | 0 | 0 |
| 5 | | 0 | 0 | 4 | 4 | 5 | 7 | 7 | 0 | 0 | Iu | Iu | Iv | 0 | 0 |
| 4 | | 0 | 0 | 4 | 5 | 5 | 7 | 7 | 0 | 0 | Iu | Iv | Iv | 0 | 0 |
| 6 | | 0 | 0 | 4 | 5 | 5 | 5 | 7 | 0 | 0 | Iu | Iv | Iv | Iv | 0 |
| 2 | | 0 | 4 | 4 | 5 | 5 | 5 | 7 | 0 | Iu | Iu | Iv | Iv | Iv | 0 |
| 3 | | 0 | 4 | 4 | 5 | 5 | 5 | 7 | 0 | Iu | Iu | Iu | Iv | Iv | 0 |

Triangle wave rising | Triangle wave falling
--- | ---
Upper arm ON timing | Upper arm OFF timing
Lower arm OFF timing | Lower arm ON timing
Upper arm ON timing | Upper arm OFF timing
Lower arm OFF timing | Lower arm ON timing
Upper arm ON timing | Upper arm OFF timing
Lower arm OFF timing | Lower arm ON timing ‖ DC link changing timing Description is made further.

Current employs vector representation by determining the flowing out direction to be 1 similarly to the voltage vector. The direction of the current becomes 4 (=100 in binary representation) when u-phase is flowing out direction while v-phase and w-phase are flowing in direction, for example. At this condition, the current appearing the DC link based upon the current and voltage vector pattern becomes a current as is illustrated in Table 4. Wherein, the voltage vector column represents the voltage vector output as the phase voltage including the dead time, a portion represented with d represents the vector output during the dead time while a portion represented with v represents the voltage vector output under a condition that the switch has settled, respectively. The DC link current column represents the current now flowing the DC link. Further, a section illustrated with a thick line represents the changing timings of voltage and current, and switch condition for causing the change is represented in the lower section. Table 4 is created by taking the vector generation based upon the triangle wave comparison as an example. It should be noted that switch operation becomes reversed depending upon the rising and falling of the triangle wave.

As is understood from Table 4 it is known that whether or not the current can be observed within the dead time based upon the outputting voltage vector, and that the current change is caused which operation of the switch.

Next, the method for determining the minimum gate pulse width is described.

Figure 24:
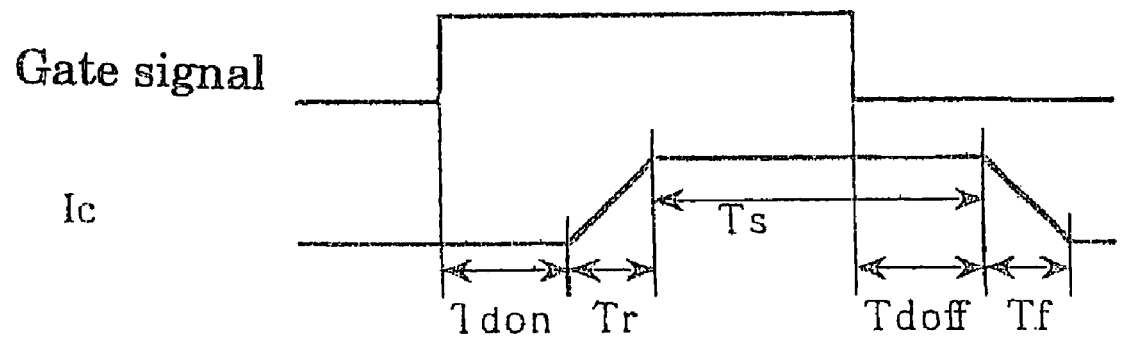
FIG. 24 is a diagram illustrating a response of an example of a power device based upon a gate signal.

The response of the power device based upon the gate signal is a response which is illustrated in FIG. 24. In FIG. 24, the gate signal is an instructing signal for turning ON/OFF the power device. Ic represents a current of the power device. Tdon represents a period from the gate signal ON till the power device signal Ic begins its changing. Tr represents a rising time of the power device current Ic. Ts represents a sample time required for current measurement (minimum vector output period). Tdoff represents a period from the gate signal OFF till the power device signal Ic begins its changing. Tf represents a falling time of the power device current Ic.

The time Ton from the gate signal ON till the power device has finish turning ON operation, and the time Toff from the gate signal OFF till the power device has finish turning OFF operation, are determined as follows:

Ton=Tdon+Tr

Toff=Tdoff+Tf

Now, the gate pulse width (a period when a vector is output on the gate signal) required for assuring Ts becomes the width illustrated in Table 3. In FIG. 3, a current detection timing is put with when the hold time is determined to be 0.

Therefore, current detection with accuracy becomes possible by the following operation: the direction of the current at the detection timing is estimated; the switch operations prior to and after the vector output are calculated using Table 4 from the estimated direction of the current at the detection timing and the voltage vector to be output; the gate pulse width for detection is calculated; the gate pulse width is corrected to be longer and is output when the gate pulse width to be output is shorter than the calculated gate pulse width.

It is preferable that the response time is determined for P-side, N-side and every switching device, and that the minimum gate pulse width is changed to suit the switching device causing current change. Wherein, the switching device of P-side represents the switching device connected to the positive voltage, while the switching device of N-side represents the switching device connected to the negative voltage.

It becomes possible that the minimum gate pulse width is determined by taking the response time for each interval of the switching device into consideration, by carrying out the following operation: the minimum gate pulse width and current detection timing are written which are calculated by further taking the response time of the device into consideration which response time is at every entry provided for every combination of the direction of the current and voltage vector in the vector pattern table 11b of FIG. 23; the gate pulse width are enlarged by each of the pair of gate pulse width enlargement sections 11c when the length of the instructed voltage vector for the motor controlling is shorter than the minimum gate pulse width.

The direction of the current can be calculated from the phase information of the current.

Description is made further.

Figure 25:
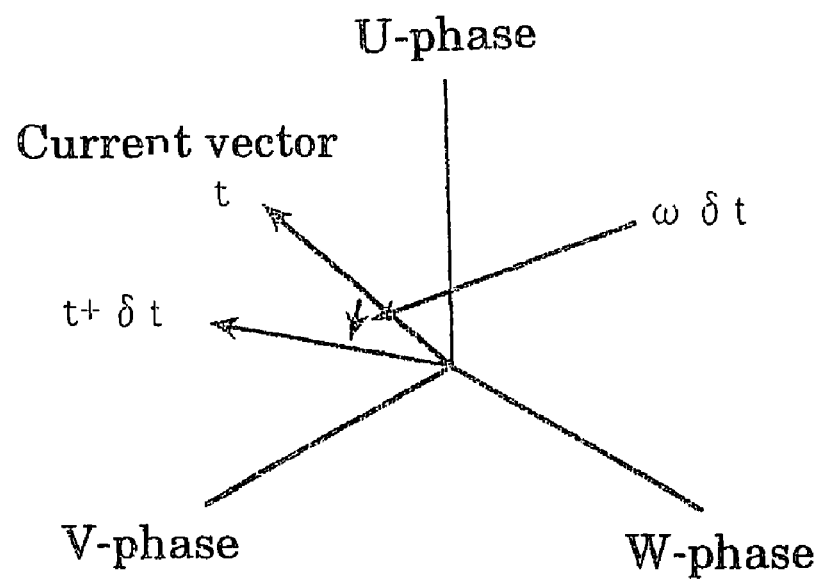
FIG. 25 is a schematic diagram illustrating the processing for calculating the direction of the current from the phase information of the current.

When the electric angular rotation speed of the motor is supposed to be, as is illustrated in FIG. 25, it is understood that the current vector at the time t on UVW coordinates advances t after the time has passed. Therefore, the current vector which is advanced the current vector by t is estimated, then the direction of the current of each phase is calculated based upon the direction. In this case, no error due to rotation is generated so that the estimation with high accuracy becomes possible for a case such as high speed rotation.

Figure 26:
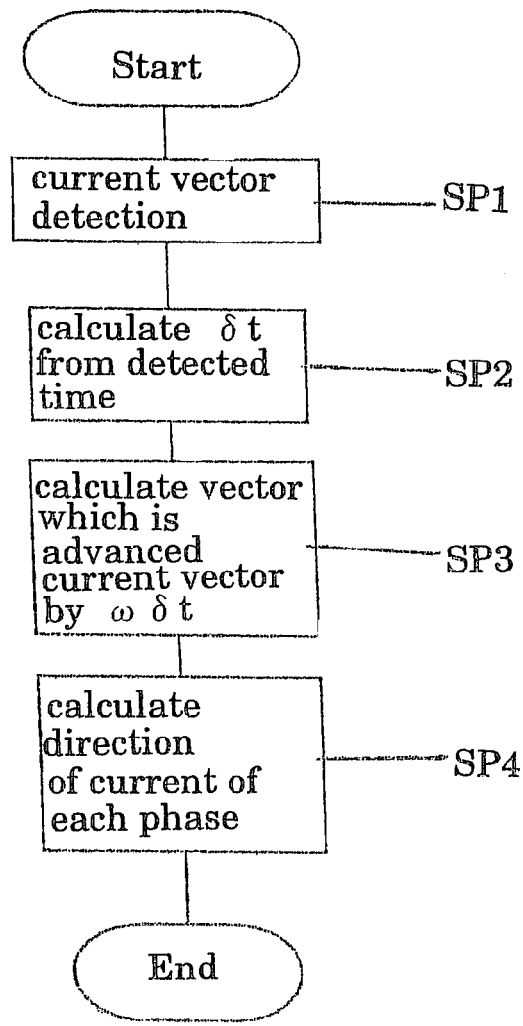
FIG. 26 is a flowchart useful in understanding the processing for calculating the direction of the current from the phase information of the current.
Figure 27:
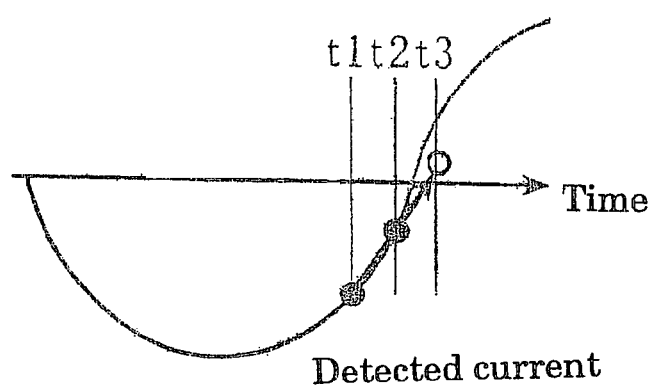
FIG. 27 is a schematic diagram illustrating the processing for estimating the direction of the current from the sequence of current values.

FIG. 26 is a flowchart useful in understanding the processing.

In step SP1, the current vector is detected. In step SP2, t is calculated from the detection time. In step SP3, the vector advanced the current vector by t is calculated. In step SP4, the direction of the current of each phase is calculated. Then, the series of operation has finished.

The direction of the current can also be estimated from the sequence of current values.

Description is made further.

It is possible that the current value at time t3 is calculated by the linear extrapolation, for example, from the detection current at time t1 and detection current at time t2 both corresponding to one phase, and that the direction of the current is calculated using this current value. In this case, the direction of the current can be detected even when measurement error exists in the rotation speed, because the rotation speed information and the like are not used. Further, error can be made smaller even when the current changes relatively faster with respect to the rotation speed.

Here, the linear estimation is exemplified, but improvement in accuracy is possible of course by carrying out higher estimation.

Further, it is preferable that the processing for calculating the direction of the current from the phase information of current and the processing for estimating the direction of the current from the sequence of current values are changed over depending upon the rotation speed.

The processing for calculating the direction of the current from the phase information of current is effective for high speed case, while the processing for estimating the direction of the current from the sequence of current values is effective for great current variation case, as are described earlier. Therefore, the estimation of current direction with high accuracy is always possible by properly changing over and using the above processing in response with the rotation speed.

Further, when there exists a potential that a wrong direction of current due to the estimated current being within the current estimation error, it is preferable that the pulse width restriction is applied to the vector output time excluding the dead time.

Description is made further.

The direction of current may be estimated to be a wrong direction due to measurement error, estimation error when the current value becomes smaller. In this case, the current measurement may become impossible to be carried out by the appearing vector within the dead time changes as is understood from Table 4, and by calculating the minimum gate pulse restriction width to have a wrong value. Therefore, it is possible that the current detection is assured by calculating the magnitude of the pulse width restriction under the assumption that the current detection cannot be carried out during the dead time, when the estimated current becomes to have a magnitude which is within the current estimation error.

When the direction of U-phase current is not known because the U-phase current is small and the current direction is 1, output vectors are 4 and 6, the current direction becomes 1 or 5. Therefore, it is not clear whether or not the vector of 4 appears within the dead time period. In this case, the assure current detection is possible to be carried out by calculating the minimum gate pulse width as the current direction of 5 in which the vector of 4 does not appear within the dead time.

Further, it is preferable that the current detection is carried out by turning off one switching device for a time required for current detection when the current detection is carried out at the time maximum voltage is output, for example.

Description is made further.

When a high output voltage is output in PWM inverter, continuing the output of one vector within a carrier is carried out. Two currents required for the motor current detection cannot be detected in this case because only one vector is output.

For this sake, it becomes necessary that the current detection is carried out by outputting the vector for current detection although the output voltage is lowered to some degree. In this case, and when the vector for detection is output using complementary PWM similarly to ordinary modulation, a dead time for vector output and a dead time for returning to the original vector become necessary so that the output time of the original vector to be output is greatly reduced.

Figure 28:
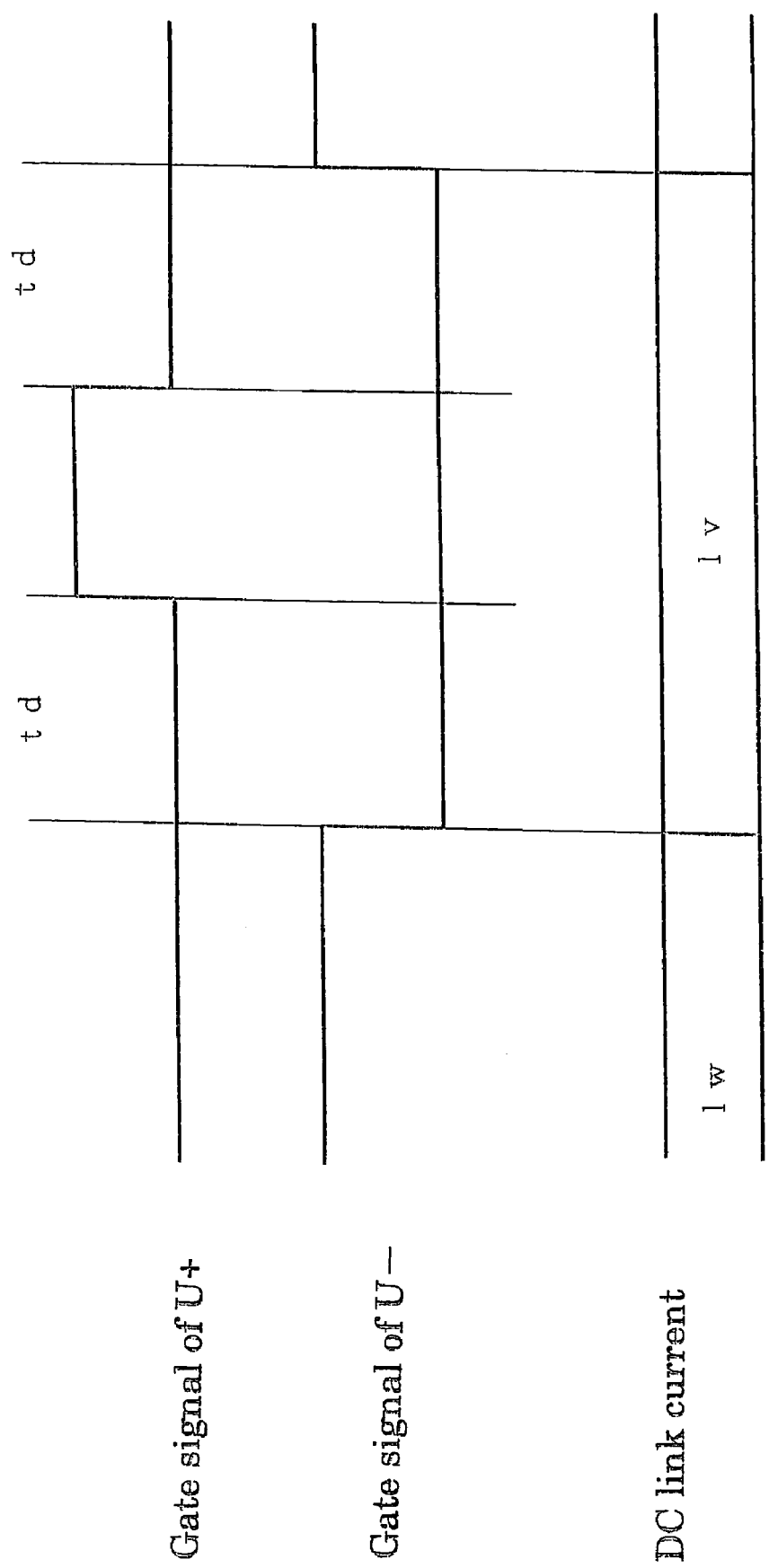
FIG. 28 is a schematic diagram illustrating the processing of an example for turning off the switching device for current detection.

The v-phase current can be detected from the DC link by turning off the gate signal of $T_u^-$ in FIG. 3, for example. In this case, and when the gate signal of $T_u^+$ is turned on, dead time td is needed for on and off of $T_u^+$, respectively, as is illustrated in FIG. 28. When this is longer than the time for current detection, the output voltage is lowered more than necessity.

In such case, the current can be detected by creating dead time condition by selectively turning off the device being detected its current by turning off the switching device. Even when the current detection cannot be carried out only within the dead time period, the current detection can be carried out by continuing the dead time condition for a long time without turning on of the switch complementarily connected. Due to this, a detection pulse having an arbitrary length not affected by the dead time can be created, and the voltage can effectively be output.

It is also preferable in the apparatus for controlling the motor by detecting the motor current from the current flowing the DC link that a condition becoming a condition in which one voltage vector is continuously output within a carrier is avoided to the utmost by controlling the DC link voltage to be low so as to maintain the pulse width being wide in response to the voltage required by the motor being low, and by controlling the DC link voltage to be high in response to the voltage required by the motor being high.

Description is made further.

Figure 30:
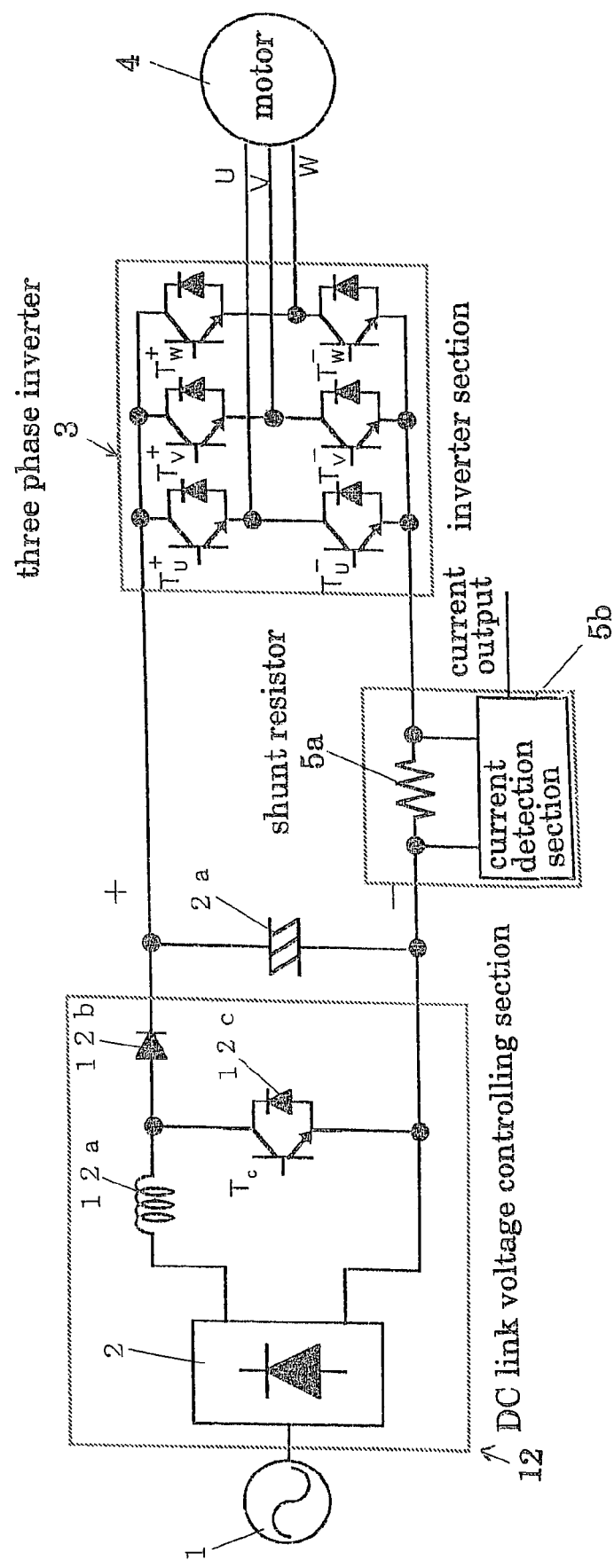
FIG. 30 is an electric circuitry diagram illustrating a motor controlling apparatus of an embodiment according to the present invention.

FIG. 30 illustrates a circuit arrangement example.

A DC link voltage controlling section 12 is constructed so that the voltage of the DC link can be controlled by changing over the conduction condition of the switching device Tc provided within the converter which creates a DC current from the commercial power 1. The switching device Tc is connected between the connection point of the reactor 12a and diode 12b and one of the output terminals of the rectifier circuit 2, the reactor 12a and diode 12b being connected in series to one another to the other of the output terminals of the rectifier circuit 2. And, a protection diode 12c is connected in parallel to the switching device Tc.

The inverter section 3 receives the DC link voltage as input, applies the PWM modulation, and creates a voltage required for motor driving. Though the vector output period at the inverter section is determined based upon a ratio of the DC link voltage and a voltage to be output to the motor 4, the higher the motor voltage is and the lower the DC link voltage is, the longer the vector output period is. On the other hand, the current detection in the current detector can detect the current accurately without the minimum pulse width restriction and the like as the vector output period being longer. Therefore, the current detection can be carried out with high accuracy and with smooth waveform without the minimum pulse width restriction, by controlling the DC link voltage to be low when the motor required voltage is low.

On the contrary, the vector output period become longer when the motor required voltage becomes higher. Finally, a condition is realized that one vector is continuously output within a carrier. By taking this into consideration, it can be possible that two vectors similar to those of ordinary case are generated within a carrier and that two phase currents are detected, by controlling the DC link voltage to be high when the motor required voltage is high.

Further, it is preferable that the controlling is carried out so as to make the current detection easier by lowering the power factor when the rotation speed is low or the load is light causing the output voltage or output current becomes higher.

Description is made further.

A terminal voltage of a motor greatly changes depending upon a current phase even when a torque is not changed, as is illustrated in "High Efficiency Driving And Controlling Method For IPM Motor For Air Conditioner Using Sine Wave Driving", Matsuno et al., Dengakuron D, Vol. 119, No. 10, Heisei 11 nen (1999) (hereinafter, referred to as reference document 2). Therefore, the current detection can easily be carried out by advancing the current phase so as to raise the output voltage when the rotation speed is low causing the vector outputting period becomes shorter, or by advancing or descending the current phase so as to increase the motor terminal current when the load is light causing the output current becomes smaller and causing the current direction detection becomes difficult.

Further, it is preferable that the switching pattern at the voltage changing timing is calculated from the current direction and output vector pattern, the delay time of the device is calculated from this calculation result, then the voltage is corrected, when the motor is controlled by calculating the motor voltage from the DC link voltage and gate pulse width.

Description is made further.

Figure 31:
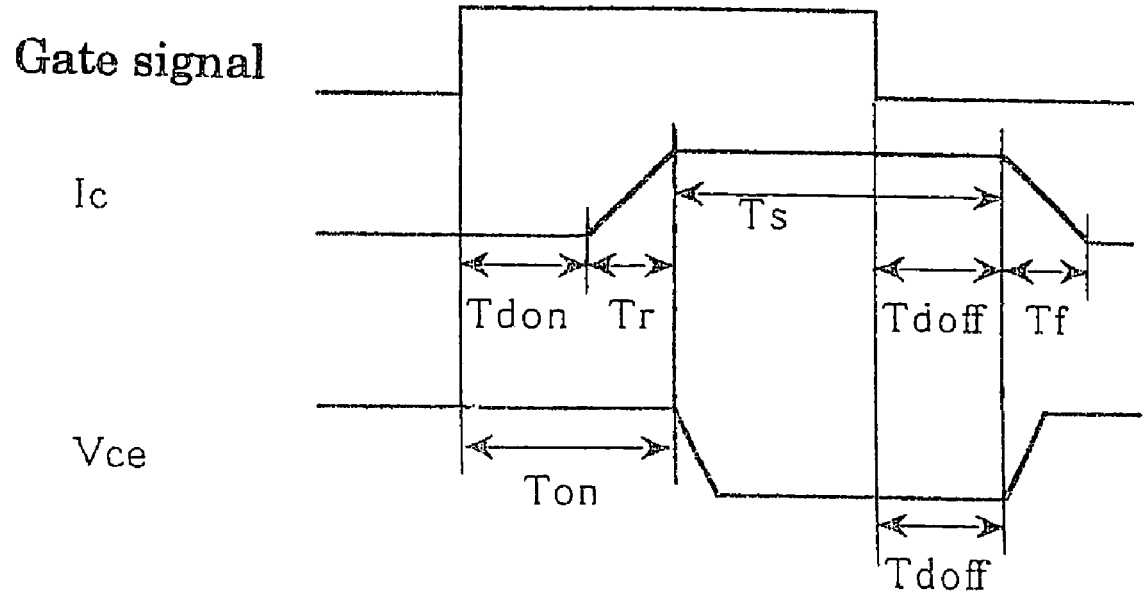
FIG. 31 is a diagram illustrating the response of another example of the power device based upon the gate signal.

The relationship between the gate signal, power device current Ic, and the voltage between the collector-emitter of the power device is illustrated in FIG. 31.

For the inverter circuit, even when the gate signal turns on and the power device current Ic begins to flow, the voltage Vce does not vanish at once so that the voltage Vce becomes 0 immediately at the timing that all motor currents are covered by the power device current Ic. When the gate signal turns off, the reflux diode turns off at the timing that the power device current Ic becomes small, therefore the voltage Vce becomes greater. Consequently, the transient time relating the voltage may be Ton for turning on or Tdoff for turning off.

Then, the vector output period is calculated from the current direction and output voltage vector pattern by taking the vector output during the dead time period into consideration. And, the voltage is corrected by determining the transient time to be Ton for turning on or Tdoff for turning off by the switching operation. Consequently, the voltage detection with high accuracy can be realized.

Further, it is preferable that the gate pulse width is calculated so that the length of the command voltage vector and vector output period are equal to one another when the vector output period is longer than the minimum vector output period.

Description is made further.

It is easy that the gate pulse width is controlled so that the length of the command voltage vector output from the motor controlling and the length of the voltage vector output period are matched to one another when information of the vector length output which includes the dead time, the change of the switch causing current change, and the transient time thereof are used.

Further, it is preferable that the controlling is carried out such that all switching of the converter and the inverter are not carried out at the current detection timing, the converter for carrying out switching operation being connected to the inverter in series.

Description is made further.

Figure 32:
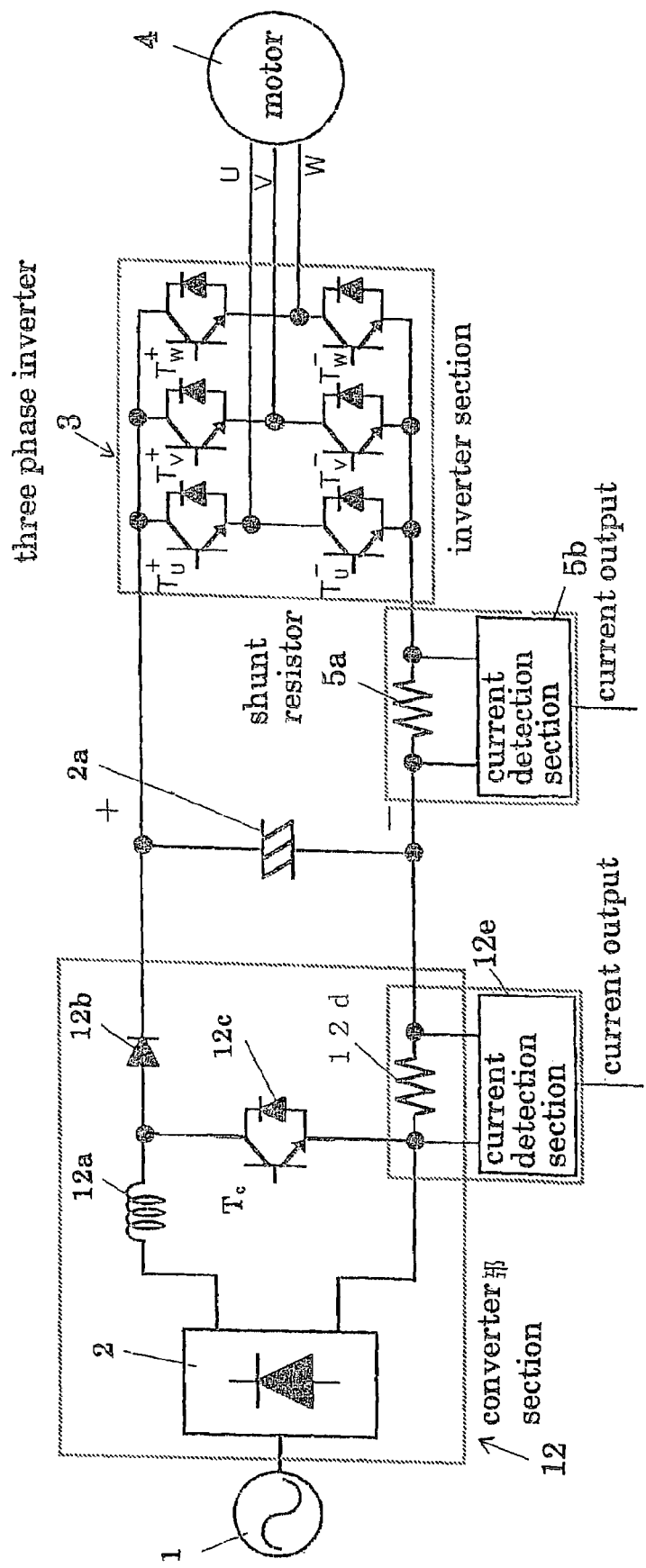
FIG. 32 is an electric circuitry diagram illustrating a phase current detection apparatus of a further embodiment according to the present invention.

A sample time for sampling current is required for the current detection, usually. When noise enters during the sample time, an error is generated in current detection result. When a motor controlling apparatus in which a converter and inverter are connected in series, is employed, as is illustrated in FIG. 32, the converter section 12 and inverter section 3 are required to detect current, the inverter section 3 and converter section 12 are isolated from one another by the condenser 2a in the circuit arrangement so that the circuit is arranged not to affect mutually. But, the inverter section 3 and converter section 12 are mutually affected by switching noise in actual. Therefore, the current detection with high accuracy is possible by preventing affection of noise by controlling the switching operation of all switching devices when each of the current detectors of the converter section 12 and inverter section 3 has entered the current detection operation such as sampling.

Further, it is preferable that a current detector is connected in series to the smoothing condenser 2a on the DC link, and that both of converter current and inverter current are detected.

Description is made further.

Figure 33:
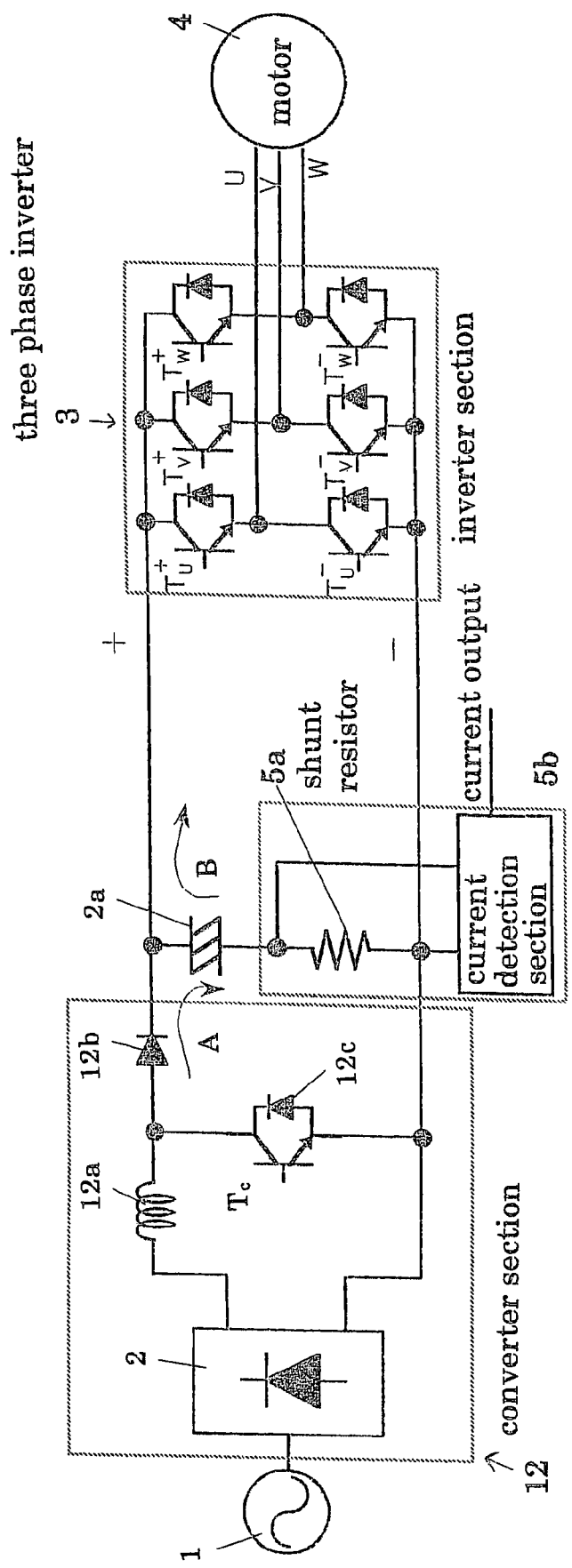
FIG. 33 is an electric circuitry diagram illustrating a phase current detection apparatus of a further embodiment according to the present invention.

FIG. 33 illustrates a circuit arrangement. A resistor 5a for current detection is connected in series to a smoothing condenser 2a which is connected to the DC link. The current flows in a direction illustrated with an arrow A when current flows into from the converter section, while the current flows in a direction illustrated with an arrow B when current flows towards the inverter section. Therefore, any one of the currents can be detected at the resistor 5a.

In operation, independent current detection becomes impossible when the current in arrow A direction and current in arrow B direction flow simultaneously. For a case where the motor voltage rises and the period when the current in arrow B direction is cut off becomes extremely short, the current can be obtained by carrying operation such that the current in the arrow B direction is measured, then A-B is measured, then the current in the arrow A direction is calculated.

By employing such arrangement, the number of current detection circuit is sufficient to be one so that reduction in cost is realized, and grounding at plural points is not needed so that measure for noise is simplified.

An embodiment of the invention has characteristic effect such that a desired voltage can be obtained in average by applying a reverse voltage so as to suppress the distortion in voltage waveform when the output voltage becomes greater than the desired voltage value due to the limitation of the minimum vector output period.

Another embodiment of the invention has characteristic effect such that the voltage outputting too much due to enlarging in length is corrected so that the voltage vector having a length longer than that of the minimum voltage vector with the command current being made smaller its error, by enlarging the voltage vector up to the voltage vector having the minimum length and by prohibiting outputting of the voltage vector for a constant period thereafter when a short voltage vector command is input.

Another embodiment of the invention has characteristic effect such that the phase current can be detected even during the dead time period.

Another embodiment of the invention has characteristic effect such that the current can be detected at the timing when the nearly average current and the DC link current coincident to one another so that the higher harmonics error can be suppressed, in addition to the effect similar to other embodiments consistent with the invention.

Another embodiment of the invention has characteristic effect such that the processing can be simplified, in addition to the effect similar to other embodiments consistent with the invention.

Another embodiment of the invention has characteristic effect such that the affection for the period when the hardware is not stable can securely be eliminated, in addition to the effect similar to other embodiments consistent with the invention.

Another embodiment of the invention has characteristic effect such that the phase current can be detected with accuracy even when the response time is long, in addition to the effect similar to other embodiments consistent with the invention.

Another embodiment of the invention has characteristic effect such that the phase current with accuracy to some degree can be employed even when accurate current measurement cannot be carried out.

Another embodiment of the invention has characteristic effect such that the phase current value with little error can be obtained even when the detection time and the current obtaining timing are different from one another.

Another embodiment of the invention has the effect similar to other embodiments consistent with the invention through carrying out the simple operation.

Another embodiment of the invention has characteristic effect such that good phase current estimation can always be realized.

Another embodiment of the invention has characteristic effect such that the current controlling following the current command can be realized and the controlling speed of the current controlling loop can be raised.

Another embodiment of the invention has characteristic effect such that a desired voltage can be obtained in average by applying a reverse voltage so as to suppress the distortion in voltage waveform when the output voltage becomes greater than the desired voltage value due to the limitation of the minimum vector output period.

Another embodiment of the invention has characteristic effect such that the voltage outputting too much due to enlarging in length is corrected so that the voltage vector having a length longer than that of the minimum voltage vector with the command current being made smaller its error, by enlarging the voltage vector up to the voltage vector having the minimum length and by prohibiting outputting of the voltage vector for a constant period thereafter when a short voltage vector command is input.

Another embodiment of the invention has characteristic effect such that the phase current can be detected even during the dead time period.

Another embodiment of the invention has characteristic effect such that the current can be detected at the timing when the nearly average current and the DC link current coincident to one another so that the higher harmonics error can be suppressed, in addition to the effect similar to other embodiments consistent with the invention.

Another embodiment of the invention has characteristic effect such that the processing can be simplified, in addition to the effect similar to other embodiments consistent with the invention.

Another embodiment of the invention has characteristic effect such that the affection for the period when the hardware is not stable can securely be eliminated, in addition to the effect similar to other embodiments consistent with the invention.

Another embodiment of the invention has characteristic effect such that the phase current can be detected with accuracy even when the response time is long, in addition to the effect similar to other embodiments consistent with the invention.

Another embodiment of the invention has characteristic effect such that the phase current with accuracy to some degree can be employed even when accurate current measurement cannot be carried out.

Another embodiment of the invention has characteristic effect such that the phase current value with little error can be obtained even when the detection time and the current obtaining timing are different from one another.

Another embodiment of the invention has the effect similar to other embodiments consistent with the invention through carrying out the simple operation.

Another embodiment of the invention has characteristic effect such that good phase current estimation can always be realized.

Another embodiment of the invention has characteristic effect such that the current controlling following the current command can be realized and the controlling speed of the current controlling loop can be raised.

Another embodiment of the invention has characteristic effect such that the secure detection of the phase current is realized.

Another embodiment of the invention has the effect similar to other embodiments consistent with the invention based upon the gate-pulse width.

Another embodiment of the invention has characteristic effect such that the secure detection of the phase current is realized.

Another embodiment of the invention has characteristic effect such that the secure detection of the phase current is realized.

Another embodiment of the invention has characteristic effect such that the minimum gate-pulse width can be determined by taking the response time for each switching device into consideration so that the effect similar to other embodiments consistent with the invention is realized.

Another embodiment of the invention has characteristic effect such that the direction of the current can be estimated with high accuracy even when the motor rotates at high speed so that the effect similar to other embodiments consistent with the invention is realized.

Another embodiment of the invention has characteristic effect such that the direction of the current can be estimated with high accuracy even when the motor rotates at low speed and when the motor torque is controlled at high speed so that the effect similar to other embodiments consistent with the invention is realized.

Another embodiment of the invention has characteristic effect such that the direction of the current can always be estimated with high accuracy so that the effect similar to other embodiments consistent with the invention is realized.

Another embodiment of the invention has characteristic effect such that the current detection is securely realized so that the effect similar to other embodiments consistent with the invention is realized.

Another embodiment of the invention has characteristic effect such that the current detection can be realized with minimum voltage drop even when only one vector is continued to be output within a carrier interval such as maximum voltage outputting, so that the effect similar to other embodiments consistent with the invention is realized.

Another embodiment of the invention has characteristic effect such that the motor can be controlled in stable condition so that the secure current detection can always be carried out while good waveform outputting can be carried out with little affection of the pulse width restriction.

Another embodiment of the invention has characteristic effect such that the current detection can be carried out with ease, in addition to the effect similar to other embodiments consistent with the invention.

Another embodiment of the invention has characteristic effect such that the voltage detection with high accuracy is realized.

Another embodiment of the invention has characteristic effect such that the current detection can securely be realized with suppression of distortion in waveform, and that the assure current detection can be realized.

Another embodiment of the invention has characteristic effect such that the current detection can be realized by removing the affection of noise.

Another embodiment of the invention has characteristic effect such that the arrangement can be simplified and the measure for noise can be realized with ease, in addition to the effect similar to other embodiments consistent with the invention.

Another embodiment of the invention has characteristic effect such that the secure detection of the phase current is realized.

Another embodiment of the invention has characteristic effect such that the secure detection of the phase current is realized.

Another embodiment of the invention has characteristic effect such that the secure detection of the phase current is realized.

Another embodiment of the invention has characteristic effect such that the minimum gate-pulse width can be determined by taking the response time for each switching device into consideration so that the effect similar to other embodiments consistent with the invention is realized.

Another embodiment of the invention has characteristic effect such that the direction of the current can be estimated with high accuracy even when the motor rotates at high speed so that the effect similar to other embodiments consistent with the invention is realized.

Another embodiment of the invention has characteristic effect such that the direction of the current can be estimated with high accuracy even when the motor rotates at low speed and when the motor torque is controlled at high speed so that the effect similar to other embodiments consistent with the invention is realized.

Another embodiment of the invention has characteristic effect such that the direction of the current can always be estimated with high accuracy so that the effect similar to other embodiments consistent with the invention is realized.

Another embodiment of the invention has characteristic effect such that the current detection is securely realized so that the effect similar to other embodiments consistent with the invention is realized.

Another embodiment of the invention has characteristic effect such that the current detection can be realized with minimum voltage drop even when only one vector is continued to be output within a carrier interval such as maximum voltage outputting, so that the effect similar to other embodiments consistent with the invention is realized.

Another embodiment of the invention has characteristic effect such that the motor can be controlled in stable condition so that the secure current detection can always be carried out while good waveform outputting can be carried out with little affection of the pulse width restriction.

Another embodiment of the invention characteristic effect such that the current detection can be carried out with ease, in addition to the effect similar to other embodiments consistent with the invention.

Another embodiment of the invention has characteristic effect such that the voltage detection with high accuracy is realized.

Another embodiment of the invention has characteristic effect such that the current detection can securely be realized with suppression of distortion in waveform, in addition to the effect similar to other embodiments consistent with the invention.

Another embodiment of the invention has characteristic effect such that the current detection can be realized by removing the affection of noise.

Another embodiment of the invention has characteristic effect such that the arrangement can be simplified and the measure for noise can be realized with ease, in addition to the effect similar to other embodiments consistent with the invention.

What is claimed is:

1. A phase current detection method for driving a motor by supplying outputs from a Pulse Width Modulation (PWM) inverter to the motor, comprising:
   detecting a DC link current and a vector pattern;
   determining whether a voltage vector length exceeds a predetermined value; and
   adjusting the voltage vector by adding a positive or reversed voltage based upon the determining and an integrated error value.

2. The phase current detection method as set forth in claim 1, wherein the DC link current detection is carried out by sampling the current at the center of a period when a current corresponding to a voltage vector is observed through a shunt resistor.

3. The phase current detection method as set forth in claim 2, wherein the DC link current detection is carried out by sampling the current at a timing which has passed a response time from the starting of the period in response to the fact that sampling at the center of the period is impossible due to the restriction of the response time.

4. The phase current detection method as set forth in claim 1, wherein the DC link current detection is carried out by sampling the current at the center of a period when a voltage vector is output.

5. The phase current detection method as set forth in claim 1, wherein the DC link current detection is carried out by sampling the current at the center of a period which is a period obtained by removing a period for hardware becoming stable starting of the period when a current corresponding to a voltage vector is observed through the shunt resistor, from the period when a current corresponding to a voltage vector is observed through the shunt resistor.

6. A phase current detection method for driving a motor by supplying outputs from a PWM inverter to the motor, comprising:
   detecting a DC link current and a vector pattern;
   correcting the current detection value using a prior current estimation value; and
   estimating a new current value at a desired timing using the corrected current detection value,
   wherein the correction of current detection value is carried out by operating an amplitude error from the error current and by adding the amplitude error to the estimated current of the desired timing.

7. A phase current detection method for driving a motor by supplying outputs from a PWM inverter to the motor, comprising:
   detecting a DC link current and a vector pattern;
   correcting the current detection value using a prior current estimation value; and
   estimating a new current value at a desired timing using the corrected current detection value, wherein the correction of current detection value is carried out by adding an error current to the estimated current value at the desired timing, and
   wherein the estimates of the new current value are based in response to the size of the amplitude.

8. A phase current detection apparatus for driving a motor by supplying outputs from a PWM inverter to the motor, comprising:
   an output time detection section which determines whether a voltage vector length exceeds a predetermined value;
   an output time enlargement section associated with the output time detection section, which enlarges an output time of the voltage vector;
   a reverse vector generation section associated with the output time enlargement section, which adjusts an applied voltage by one of adding and subtracting a voltage based upon the voltage vector length; and
   a selection section, associated with the output time enlargement section and the reverse vector generation section, which selects one of the enlarged voltage vector and the applied voltage for input into the PWM inverter, based upon the output of an output error integrating section.

9. A phase current detection apparatus for driving a motor by supplying outputs from a PWM to the motor, comprising:
   a current controlling section which receives a current command and a detected current, and provides a voltage command;
   an output time detection section which determines whether a voltage vector length exceeds a predetermined value, and provides an output pause command;
   a voltage vector generation section, associated with the current controlling section and the output time detection section, which provides a voltage vector command based upon the voltage command and the output pause command; and
   an output time enlargement section, associated with the output time detection section which varies the application interval of the voltage vector command to the PWM inverter based upon the output pause command, and enlarges an output time of the voltage vector.

10. A phase current detection apparatus for driving a motor by supplying outputs from a PWM inverter to the motor, comprising:
   a current determinator which judges whether current detection is possible during a dead time, and for carrying out current detection in response to the judgement result representing that current detection is possible;
   a current controlling section which receives a current command and a phase current output from the current determination section;
   a voltage vector generation section which receives a voltage command from the current controlling section, and produces a voltage vector command;
   an output time detection section which determines whether the voltage vector length exceeds a predetermined value, and receives a dead time permission signal, and provides an output pause command; and an output time enlargement section, associated with the output time detection section, which varies the application interval of the voltage vector to the PWM inverter based upon the output pause command, and enlarges an output time of the voltage vector.

11. The phase current detection apparatus as set forth in one of claim 8 through claim 10, further comprising a current detector which samples current at the center of a period when a current corresponding to a voltage vector is observed through a shunt resistor.

12. The phase current detection apparatus as set forth in claim 11, wherein the current detector samples current at a timing which has passed a response time from the starting of the period given that sampling at the center of the period is impossible due to the restriction of the response time, as the current detection means.

13. The phase current detection apparatus as set forth in one of claim 8 through claim 10, further comprising a current detector which samples current at the center of a period when a voltage vector is output.

14. The phase current detection apparatus as set forth in one of claim 8 through claim 10, further comprising a current detector which samples current at the center of a period which is a period obtained by removing a period for hardware becoming stable starting of the period when a current corresponding to a voltage vector is observed through the shunt resistor, from the period when a current corresponding to a voltage vector is observed through the shunt resistor.

15. A phase current detection apparatus for driving a motor by supplying outputs from a PWM inverter to the motor, comprising:
    a current estimator which estimates a current from the past current values given that an applied voltage vector is too short to measure the current; and
    a voltage vector generation section associated with the current estimator, which receives a voltage command based upon one of past current values and present current values, and produces a voltage vector command for input to the PWM inverter.

16. A phase current detection apparatus for driving a motor by supplying outputs from a PWM inverter to the motor, comprising:
    a current estimator which estimates a current value at a desired timing by correcting a current detection value using a current estimation value generated from past current detection values; and
    a voltage vector generation section, associated with the current estimator, which receives a voltage command based upon one of past current values and present current values, and provides a voltage vector command for input to the PWM inverter.

17. The phase current detection apparatus as set forth in claim 16, wherein the current estimator corrects the current detection value by adding an error current to the estimated current value at the desired timing.

18. The phase current detection apparatus as set forth in claim 16, wherein the current estimator corrects the current detection value by operating an amplitude error from the error current and by adding the amplitude error to the estimated current of the desired timing.

19. The phase current detection apparatus as set forth in claim 16, wherein the current estimator calculates an amplitude error from the error current and for correcting the detection current value by adding the amplitude error to the estimation current of the desired timing, given that the amplitude has a large value, and for correcting the current detection value by adding the error current to the estimation current value of the desired timing, in response to the fact that the amplitude has a small value.

20. A phase current detection method for driving a motor by supplying outputs from a PWM inverter to the motor, comprising:
    estimating direction of a phase current at a current detection timing, and
    varying a minimum pulse width based upon the estimation result, and
    wherein the pulse width is a gate-pulse width, and
    wherein a period is calculated when current appears on a DC link, from the current flowing direction and the vector pattern to be output, and the gate-pulse width is determined so that the calculated period becomes the minimum vector output period for current detection on the DC link.

21. A phase current detection method for driving a motor by supplying outputs from a PWM inverter to the motor, comprising:
    estimating direction of a phase current at a current detection timing, and
    varying a minimum pulse width based upon the estimation result,
    wherein the pulse width is a gate-pulse width, and
    wherein the pattern of switch operation for causing varying in output vector is estimated, and the minimum gate-pulse width is varied based upon the estimation result.

22. A phase current detection method for driving a motor by supplying outputs from a PWM inverter to the motor, comprising:
    estimating direction of a phase current at a current detection timing, and
    varying a minimum pulse width based upon the estimation result,
    wherein the pulse width is a gate-pulse width, and
    wherein a response time is determined in correspondence with the switching devices constituting the PWM inverter, and the minimum gate-pulse width is varied to match the switching devices which cause current varying.

23. A phase current detection method for driving a motor by supplying outputs from a PWM inverter to the motor, comprising:
    estimating direction of a phase current at a current detection timing, and
    varying a minimum pulse width based upon the estimation result,
    wherein the pulse width is a gate-pulse width, and
    wherein the direction of the current is estimated from the phase information of the current.

24. A phase current detection method for driving a motor by supplying outputs from a PWM inverter to the motor, comprising:
    estimating direction of a phase current at a current detection timing, and
    varying a minimum pulse width based upon the estimation result,
    wherein the pulse width is a gate-pulse width, and
    wherein the direction of the current is estimated from the sequence of the current values.

25. A phase current detection method for driving a motor by supplying outputs from a PWM inverter to the motor, comprising:
    estimating direction of a phase current at a current detection timing, and
    varying a minimum pulse width based upon the estimation result,
    wherein the pulse width is a gate-pulse width, and
    wherein the processing for estimating the direction of the current from the phase information of the current and the processing for estimating the direction of the current from the sequence of the current values are changed over, in response with the rotation speed of the motor.

26. A phase current detection method for driving a motor by supplying outputs from a PWM inverter to the motor, comprising:
estimating direction of a phase current at a current detection timing, and
varying a minimum pulse width based upon the estimation result,
wherein the pulse width is a gate-pulse width, and
wherein pulse width restriction is applied to the vector output period excluding the dead time, in response with the fact that the estimated current is within the current estimation error.

27. A phase current detection method for driving a motor by supplying outputs from a PWM inverter to the motor, comprising:
estimating direction of a phase current at a current detection timing, and
varying a minimum pulse width based upon the estimation result,
wherein the pulse width is a gate-pulse width, and
wherein one of the switching devices constituting the PWM inverter is turned off for a time required for current detection.

28. A motor controlling method, comprising:
calculating a motor voltage from a DC link voltage and a gate pulse width;
detecting a phase current from a DC link current and a vector pattern: and
controlling the DC link voltage based upon the motor voltage required by the motor further comprising:
calculating the switching pattern of a voltage varying timing from the direction of the current and the output vector pattern;
calculating the delay time of the devices based upon the calculation result; and
correcting the motor voltage.

29. A phase current detection method for driving a motor by supplying outputs from a PWM inverter to the motor, comprising:
estimating direction of a phase current at a current detection timing, and
varying a minimum pulse width based upon the estimation result,
wherein the pulse width is a gate-pulse width, and
wherein the gate-pulse width is calculated so that the length of the command voltage vector and the vector output period are equal to one another, in response with the fact that the vector output period is longer than the minimum vector output period.

30. A phase current detection apparatus for driving a motor by supplying outputs from a PWM inverter to the motor, comprising:
a current estimating section which estimates a direction of DC link current at a future time based on a prior measurement;
a vector pattern table associated with the current estimating section, which provides a voltage vector output; and
at least one gate pulse width enlargement section, associated with the vector pattern table, which varies a gate pulse width based upon the voltage vector output.

31. The phase current detection apparatus as set forth in claim 30, wherein the apparatus calculates the period when the current appears on the DC link from the current flowing direction and the vector pattern to be output, and determines the gate-pulse width so that the calculated period becomes the minimum vector output period for current detection on the DC link.

32. The phase current detection apparatus as set forth in claim 30 or claim 31, wherein the apparatus estimates the pattern of switch operation for causing varying in output vector, and for varying the minimum gate-pulse width based upon the estimation result.

33. The phase current detection apparatus as set forth in claim 30, wherein the apparatus determines a response time in correspondence with the switching devices constituting the PWM inverter, and for varying the minimum gate-pulse width to match the switching devices which cause current varying.

34. The phase current detection apparatus as set forth in claim 30, wherein the apparatus estimates the direction of the current from the phase information of the current.

35. The phase current detection apparatus as set forth in claim 30, wherein the apparatus estimates the direction of the current from the sequence of the current values.

36. The phase current detection apparatus as set forth in claim 30, wherein the apparatus changes over the processing for estimating the direction of the current from the phase information of the current and the processing for estimating the direction of the current from the sequence of the current values, in response with the rotation speed of the motor.

37. The phase current detection apparatus as set forth in claim 30, wherein the apparatus applies pulse width restriction to the vector output period excluding the dead time, in response with the fact that the estimated current is within the current estimation error.

38. The phase current detection apparatus as set forth in claim 30, wherein the apparatus turns off one of the switching devices constituting the PWM inverter for a time required for current detection.

39. The phase current detection apparatus as set forth in claim 30, wherein the apparatus calculates the gate-pulse width so that the length of the command voltage vector and the vector output period are equal to one another, in response with the fact that the vector output period is longer than the minimum vector output period.

40. The phase current detection apparatus as set forth in claim 30, further comprises:
a converter for carrying out a switching operation is connected to the PWM inverter in series; and
a the converter inverter control which prohibits switching of the converter and the PWM inverter at the current detection timing.

41. The phase current detection apparatus as set forth in claim 40 further comprising: a current detection section, which is in series with respect to a smoothing condenser on the DC which detects the converter current and the inverter current.

42. A motor controlling apparatus for driving a motor by supplying outputs from a PWM inverter to the motor comprising:
a current detection section for determining a DC link current; and
a DC link voltage controlling section, associated with the current detection section, which varies the DC link voltage based upon a voltage required by a motor,
wherein the DC link voltage controlling section calculates the switching pattern of the voltage varying timing from the direction of the current and the output vector pattern, calculates the delay time of the devices based upon the calculation result, and corrects the motor voltage.

* * * * *